US006608282B2

(12) United States Patent
Tomlinson et al.

(10) Patent No.: US 6,608,282 B2
(45) Date of Patent: Aug. 19, 2003

(54) MACHINE TOOL LOADING APPARATUS

(75) Inventors: Michael A. Tomlinson, Roscoe, IL (US); Sidney B. Schaaf, DeKalb, IL (US); Alfred J. Julian, Roscoe, IL (US)

(73) Assignee: W.A. Whitney Co., Rockford, IL (US)

( * ) Notice: Subject to any disclaimer, the term of this patent is extended or adjusted under 35 U.S.C. 154(b) by 0 days.

(21) Appl. No.: 09/946,393

(22) Filed: Sep. 5, 2001

(65) Prior Publication Data

US 2002/0148820 A1 Oct. 17, 2002

Related U.S. Application Data

(60) Provisional application No. 60/283,300, filed on Apr. 12, 2001.

(51) Int. Cl.[7] .............................................. B23K 26/02
(52) U.S. Cl. .............................. 219/121.82; 219/121.83
(58) Field of Search ....................... 219/121.82, 121.83, 219/121.6

(56) References Cited

U.S. PATENT DOCUMENTS

| 4,690,021 A | | 9/1987 | Clark ............................ 83/71 |
| 4,709,605 A | * | 12/1987 | Clark ............................ 83/23 |
| 4,804,173 A | | 2/1989 | Pol et al. ...................... 271/11 |
| 4,971,515 A | | 11/1990 | Pol et al. | |
| 5,040,030 A | | 8/1991 | Ziegelmuller ................ 355/299 |
| 5,049,030 A | | 9/1991 | Lockert | |
| 5,120,178 A | * | 6/1992 | Ito ............................... 414/225 |
| 5,151,009 A | | 9/1992 | Lockert .................... 414/793.5 |
| 5,347,898 A | | 9/1994 | Ito ................................ 83/27 |
| 5,358,375 A | * | 10/1994 | Kawada et al. ............. 414/277 |
| 5,378,375 A | | 1/1995 | Bache ......................... 210/772 |
| 5,941,673 A | | 8/1999 | Hayakawa et al. ......... 414/416 |
| 6,179,547 B1 | | 1/2001 | Hayakawa ................ 414/788.4 |

OTHER PUBLICATIONS

New From W.A. Whitney—PlatePartner Semi-Automatic Loading System Brochure, 11/99.
W.A. Whitney Model 3400 RTC-60 Punch/Plasma Fabricating Center Brochure, 5/00.

* cited by examiner

Primary Examiner—M. Alexandra Elve
(74) Attorney, Agent, or Firm—Leydig, Voit, & Mayer, Ltd.

(57) ABSTRACT

A machine tool loading apparatus is adapted to register the sheets being loaded directly in the workclamps of the machine tool. A four bar linkage is utilized to control the position of the sheet as the loader removes it from the supply stack and brings it into the workclamps. The four bar linkage is provided with a controlled amount of compliance which is released as the sheet is brought into the workclamps. The sheet is thus allowed a limited ability to be repositioned as the loading mechanism guides it into the workclamps, so that a registered position is achieved before the workclamps are closed. The preferred loader apparatus can be used to unload large parts from the machine tool. The loader apparatus may be adapted to the machine tool in conjunction with a material storage tower.

52 Claims, 12 Drawing Sheets

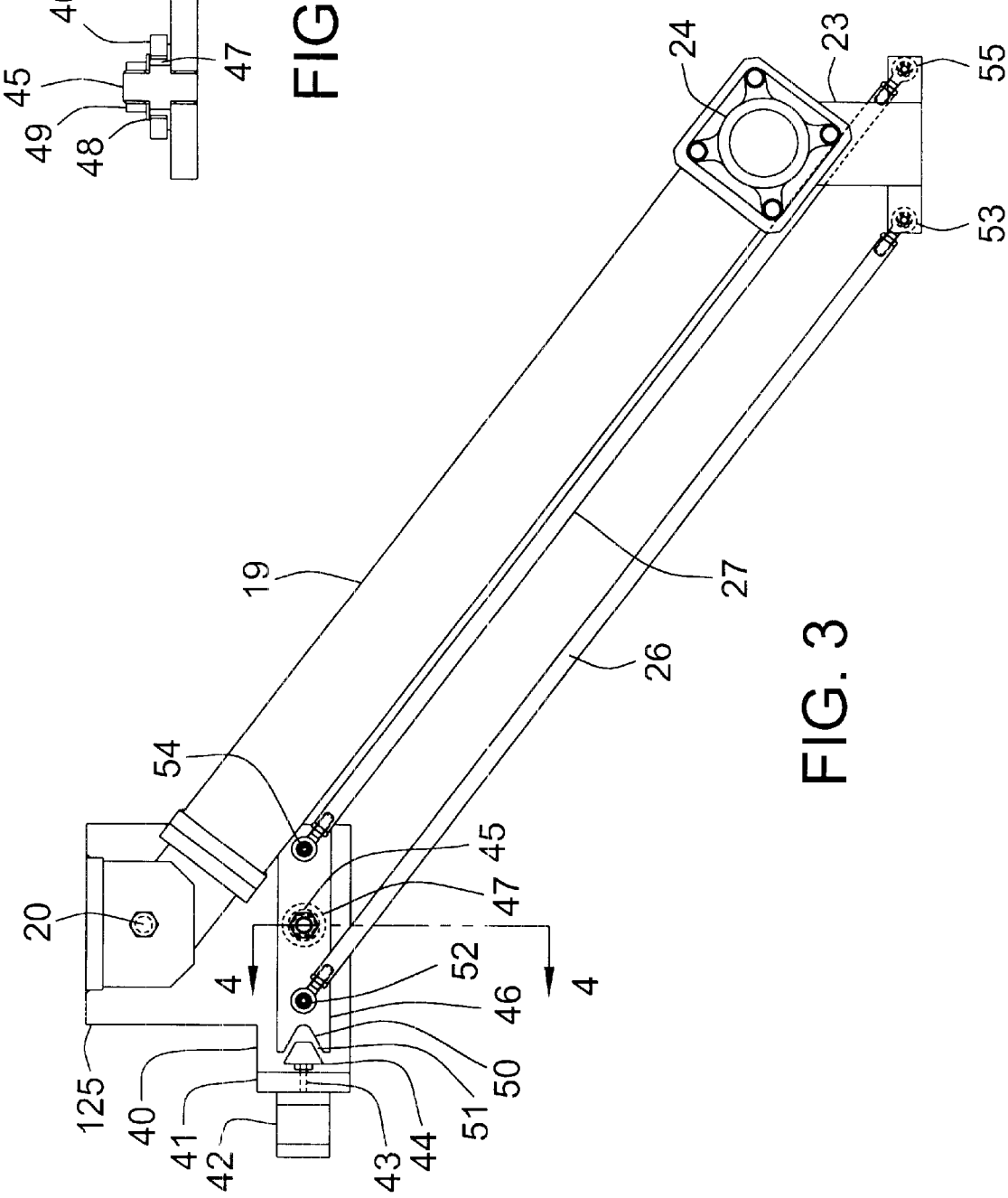

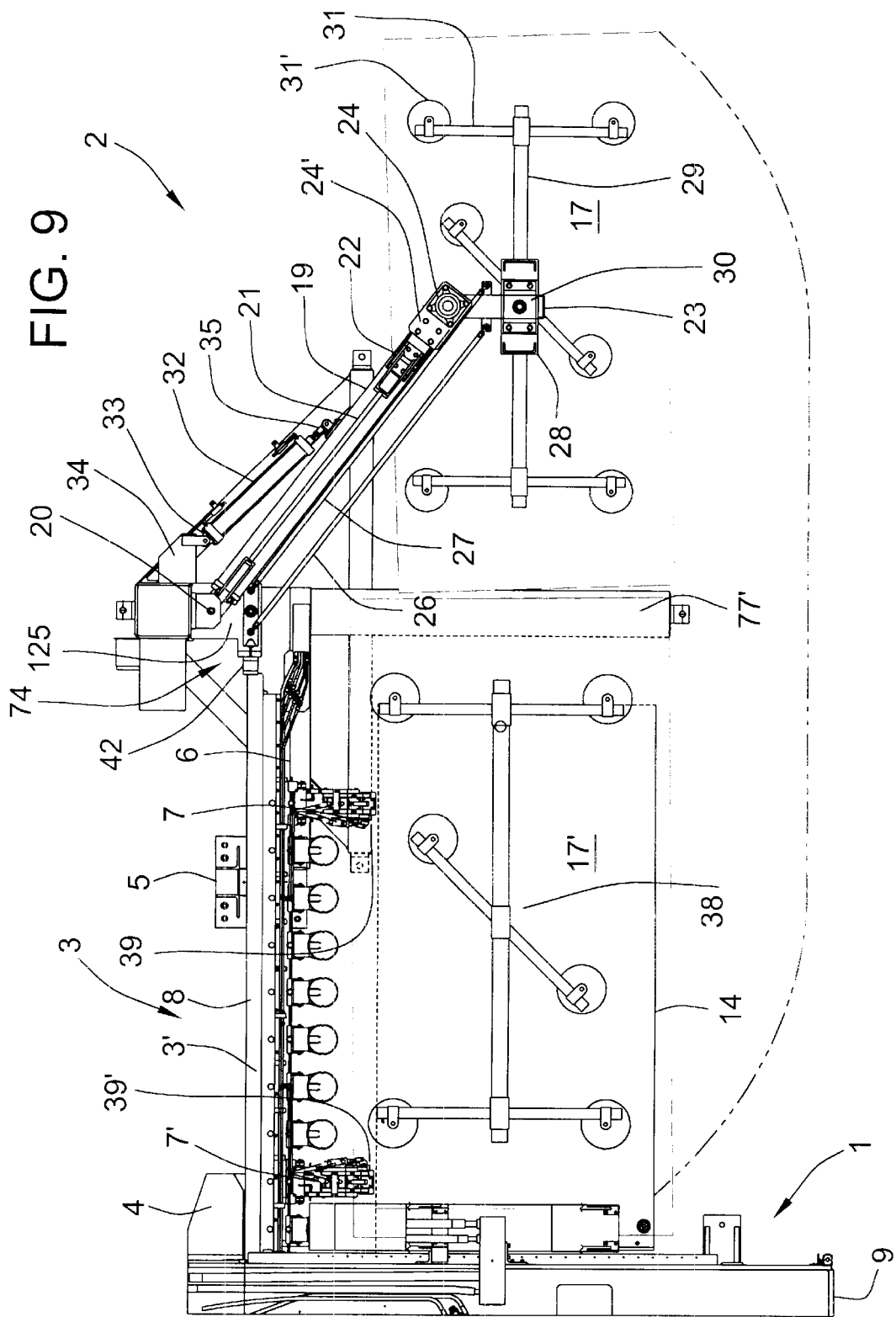

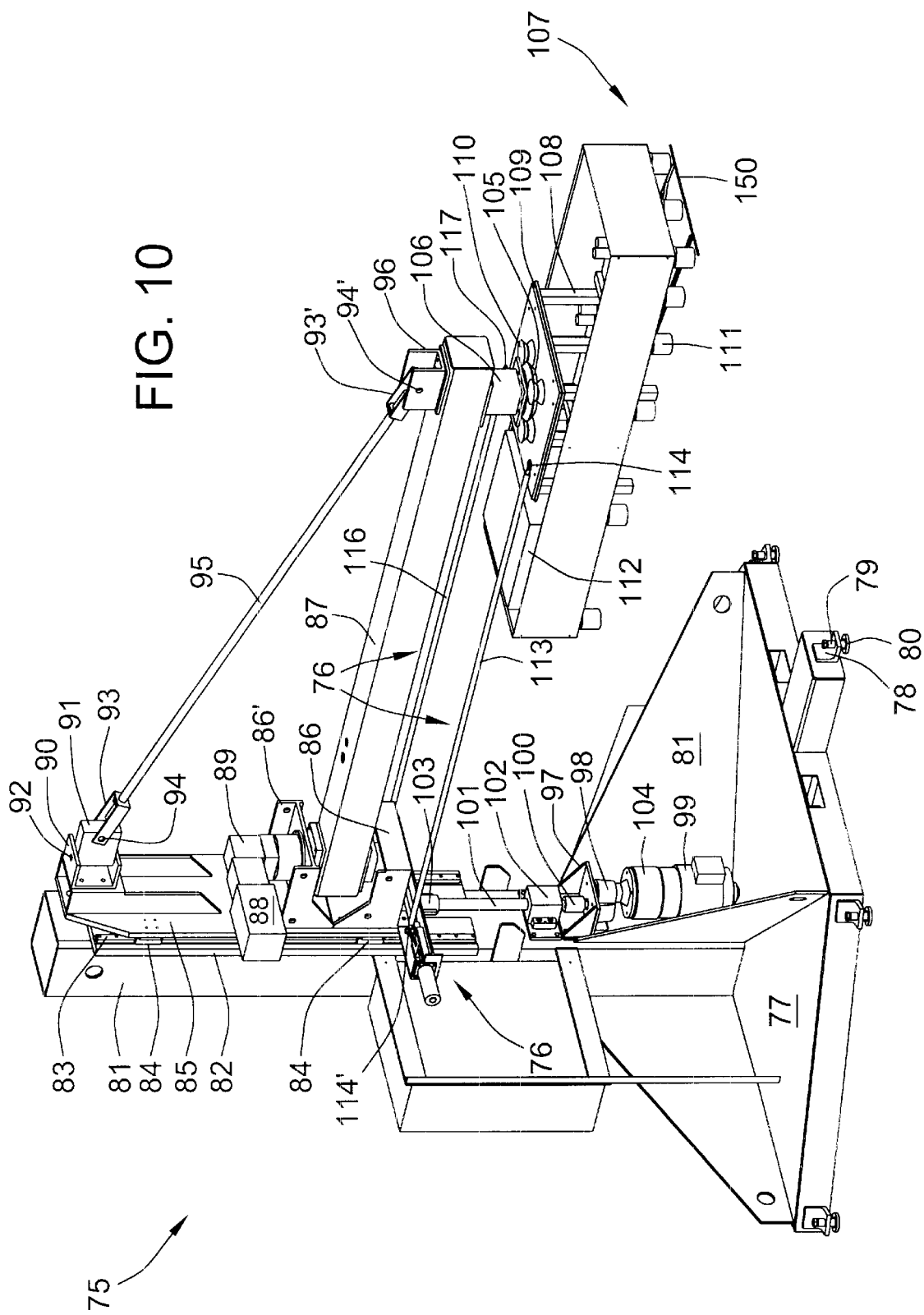

MACHINE TOOL LOADING APPARATUS

CROSS-REFERENCE TO RELATED PATENT APPLICATIONS

This patent application claims the benefit of U.S. provisional patent application 60/283,300, filed Apr. 12, 2001.

FIELD OF THE INVENTION

The present invention generally relates to machine tools, more particularly relates to apparatus for automatically loading machine tools, and in particular to an apparatus for automatically loading machine tools which operate on sheet or plate including a CNC punch press machine tool, a CNC punch press machine tool having a thermal cutting apparatus such as a plasma torch or a laser, a plasma cutting machine tool or a laser cutting machine tool.

BACKGROUND OF THE INVENTION

FIGS. 1 and 2 are provided for background, and show a well-known type of punch press with thermal cutting capability, associated with a loader mechanism. The punch press is representative of the broad range of machine tools with which a loader according to the present invention can be associated. In greater detail, FIG. 1 shows machine tool 1, a CNC punch press having a loading apparatus 2. CNC punch press 1 has an X-axis 3 based on a rail 3' supported by bracket 4 and pedestals 5 and 5', carrying a translatable table 6.

Translatable table 6 is driven by a servomotor and ballscrew that cannot be seen and carries two workclamps 7 and 7' for gripping the work, and several sets of punching tools 8. The Y-axis is defined by a frame 9 carrying a translatable punching cylinder 10 and a translatable die support 11. Punching cylinder 10 is driven via a servomotor 200 connected by coupling 201 to ballscrew 202. At the left side and connected to the mounting plate of punching cylinder 10 is a plasma torch 203 for cutting large holes and the outer boundary of parts from workpiece 17. Below and to the immediate left of torch 203 is a drop leaf table apparatus 204 for removal of small parts after they have been cut from material 17. An electrical cabinet houses the CNC 12 along with other electrical controls, and operator station 13 provides the man/machine interface for machine tool 1. Worktable 14 on the right side of frame 9 and worktable 15 on the left side of frame 9 and drop leaf table 204 are adapted with ball transfers 16 to support the material 17 to be processed. Material 17 is flat, rectangular metal sheet and plate.

In operation, material 17 is gripped by workclamps 7 and 7' and moved and positioned under CNC control along X axis 3 while punching cylinder 10 and die support 11 are moved and positioned under CNC control along the Y-axis. The work is positioned and tools are selected according to a part program processed by the CNC 12. At commanded positions the CNC 12 cycles punching cylinder 10 to punch a hole in the work. After all holes have been punched the CNC 12 in like manner positions the plasma torch 203 to commanded positions, lowers plasma torch 203 to the work 17, ignites plasma torch 203 then coordinates the velocity and motion of the X and Y axes to move plasma torch 203 along a described path to create a hole or to cut a part from material 17. Small parts cut from the material are unloaded via drop leaf table 204 and large parts are removed manually, with the assist of a hoist or crane, or by other means.

A supply of material 17 is staged on loading apparatus 2 at the right side of machine tool 1. Loading apparatus 2 typically includes a base 77' having a freestanding column 18 supporting a power driven cantilevered beam 19, pivotable at the proximal end of cantilevered beam 19 about supporting point 20. Cantilevered beam 19 is often further strengthened by a support rod 21, connected to cantilevered beam 19 at 22 and pivotally connected to column 18 directly above and inline with supporting point 20. Carried at the distal end of cantilevered beam 19 is a pivotable member 23, which is pivotable about bearing 24. In the illustrated embodiment two bearings 24 are mounted to plates 24' bolted to the distal end of beam 19, one attached to the upper side of beam 19 and one to the bottom side of beam 19. The angular position of pivotable member 23 relative to machine tool 1 is fixed by a four bar linkage to stabilize the pivotable member 23 so as to maintain the long side of rectangular material 17 generally parallel to the X axis 3 of machine tool 1.

The first bar of the four bar linkage is attachment plate 25, which is connected to freestanding column 18. The second bar is bar 26 pivotally connected to attachment plate 25 and pivotally connected to pivotable member 23. The third bar is bar 27 pivotally connected to attachment plate 25 and pivotally connected to pivotable member 23. The fourth bar is the pivotable member or extension 23.

In the present embodiment, part handling apparatus generally indicated at 29a include mast 28 which is carried by and connected to pivotable member 23, and is adapted to support and vertically translate load beam 29 via cylinder 30. Bars 31 are adjustably connected to load beam 29 and are adapted with vacuum cups 31 ' to pick up material 17.

The powered drive for the cantilevered beam 19 is shown as a cylinder 32, which is pivotally connected at 33 to a plate 34 attached to freestanding column 18, and pivotally connected to cantilevered beam 19 at 35. Curved line 36 traces the path of the center of the mast as cantilevered beam 19 is pivoted by cylinder 32. Line 37 generally traces the path of the front edge of material 17 as it is transferred from the staging position to worktable 14 and workclamps 7 and 7' of machine tool When commanded to load a sheet of material, cylinder 30 lowers the vacuum cups to the supply of material 17. A sensor detects the presence of a sheet for pickup. The vacuum cups are engaged to grip the top sheet, cylinder 30 lifts the load beam picking up the top sheet of material, cylinder 32 pivots cantilevered beam 19 clockwise until the sheet is over worktable 14, cylinder 30 lowers the load beam and attached sheet to the surface of worktable 14, cylinder 32 pivots cantilevered beam clockwise to urge the sheet into the workclamps and toward workclamp registration surfaces 39' and 39. Sensors associated with workclamp registration surfaces detect the sheet is loaded and cause the workclamps to grip the sheet. Then the vacuum cups release the sheet, cylinder 30 lifts the load beam and vacuum cups above the sheet, and cylinder 32 pivots cantilevered beam 19 counterclockwise positioning it once more over material 17 at the staging area.

While loader apparatus 2 can reliably deliver sheets of material to worktable 14 of machine tool 1, it cannot reliably load the material into workclamps 7 and 7' in a registered orientation. If the sheet 17 in the supply stack is perfectly aligned with the X-axis of the machine tool, the four bar linkage is designed to deliver the sheets to the workclamps in parallel alignment with the X-axis as desired. But very often the sheet in the supply stack is not perfectly aligned, and therefore delivery into the workclamps is not reliably accomplished.

FIG. 2 is an enlarged drawing of the material loading side of machine tool 1 showing a fragment of machine tool 1. Like objects are identified with the same numbers as in FIG. 1. Workpiece 17, FIG. 2, is shown residing in an angular relationship to the X-axis of machine tool 1. Such conditions can occur several ways. The sheet may have been improperly stacked in preparation, the stack of material may have been jostled during transport, or the stack may have been improperly loaded on the loader staging station.

Workpiece 17', FIG. 2, represents workpiece 17 after it is loaded on worktable 14. Note that the left end of sheet 17' is in contact with registration surface 39' while the right end is not in contact with registration surface 39. Loader 2 is a typical machine tool quality device with typical machine tool accuracy and repeatability, and it therefore lacks adequate compliance to successfully load the angular sheet. Loader apparatus 2 will stall at the position shown in which the sheet is not fully registered with the workclamps.

The problem exemplified in FIG. 2 is but one example of a condition that can cause failure of an automatic load cycle. Any condition in which the sheet is angularly rotated relative to the X-axis of machine tool 1 can cause similar load failure.

SUMMARY OF THE INVENTION

It is an objective of the invention to add controlled compliance to a loader, such that it can automatically and reliably load a sheet or plate into the workclamps of a CNC machine tool such as a punch press, while minimizing additional hardware and cost to do so.

Broadly, it is an object of the invention to provide an automated loader for a machine tool which cooperates with the machine tool to load the sheet or plate in a position which is registered along at least one axis. Such automated loading is accomplished without the need to move the workclamps along that axis during the loading operation.

It is a further objective of the invention to automatically gauge or position the loaded sheet such that the sheet can be processed by the CNC machine tool.

It is a feature of the invention that controlled compliance is added to a loader by providing a releasable four bar linkage.

It is a further feature of the invention to make one link of a four bar linkage pivotable and to provide a mechanism to alternately lock the link in position and release to the link such that it is free to pivot.

In that regard, a further feature is to restrict the range of motion of the releasable link of the four bar mechanism when it is in the released position.

A further objective of the invention is to provide a releasable four bar linkage that is easily adapted to other embodiments of loading or loading/unloading apparatuses.

Another objective of the invention is to provide a preferred embodiment of a loading device that can also be used to unload completed parts from a machine tool.

BRIEF DESCRIPTION OF THE DRAWINGS

FIG. 3 is a drawing of a releasable four bar linkage.

FIG. 4 is an enlarged section view taken through 4—4 of FIG. 3

FIG. 9 shows the loading apparatus of FIG. 2 embodied with the releasable four bar linkage of FIGS. 3 and 4, making the loader suitable to load sheets directly into the workclamps.

FIG. 10 is a preferred embodiment of a loading apparatus, having a four bar lock/release apparatus in preferred form, and that can also unload finished parts from the machine tool.

Figure 1:
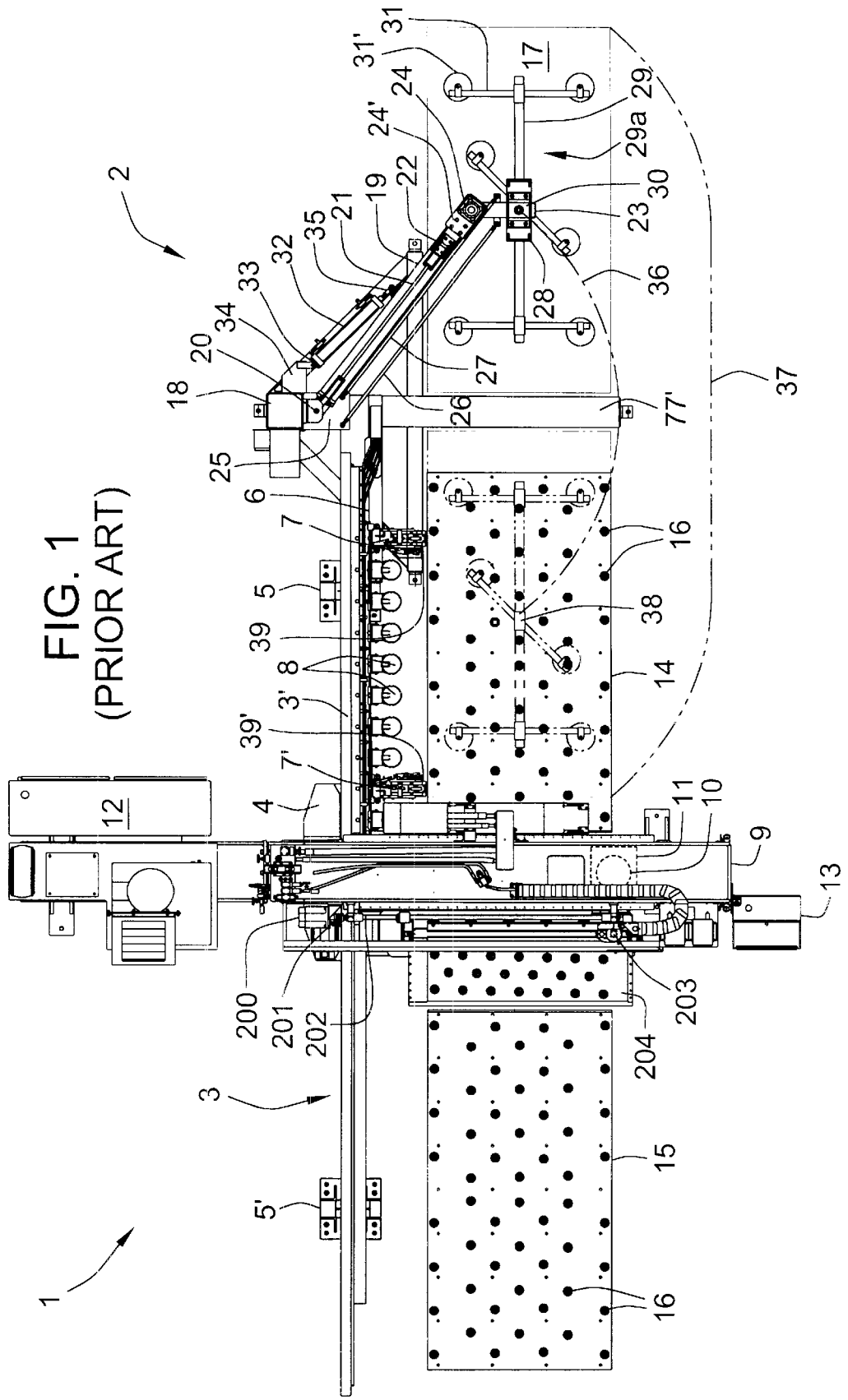
FIG. 1, provided for background, is a plan view of a machine tool having a loader apparatus adapted with a fixed four bar linkage.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE INVENTION

Figure 2:
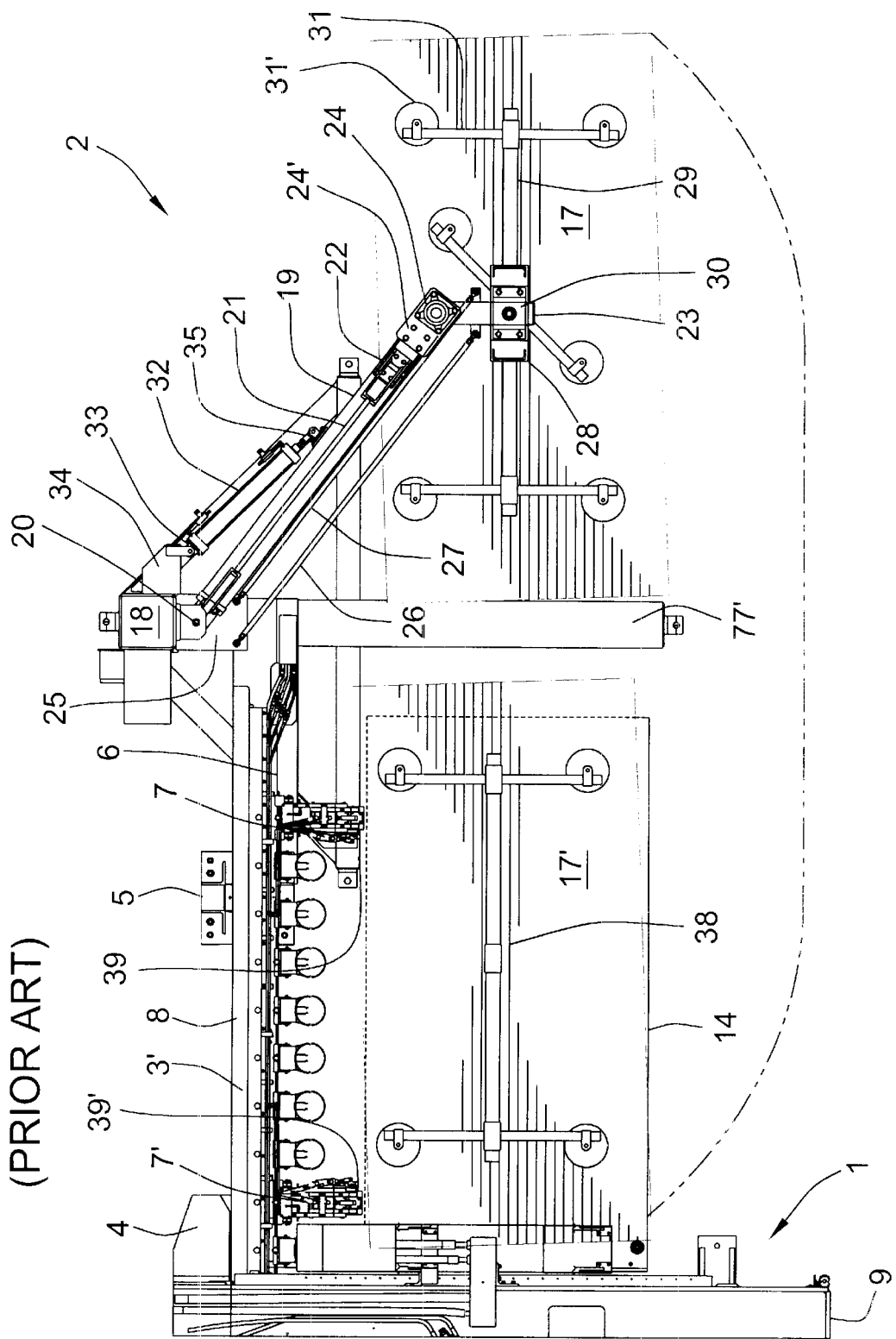
FIG. 2, provided for background, is an enlarged drawing of the material loading side of machine tool 1 showing a fragment of machine tool 1, and showing the top sheet of the supply of material 17 in an angular relationship to the X-axis of machine tool 1.

Turning now to the drawings, FIG. 3 shows a four bar linkage similar to that of FIGS. 1 and 2 but adapted, in accordance with the invention, to be lockable and releasable. Items equivalent to those of FIGS. 1 and 2 are identified with same numbers. Column 18, mast 28 and load beam 29 have been omitted to focus on the four bar linkage and lock/release mechanism. In this example the cantilevered beam 19 of FIG. 3 does not have an additional support rod 21. The configuration of attachment plate 125 has been changed. It is no longer one of the bars of the four bar linkage but instead pivotably supports one of the bars of the four bar linkage as will be described. The attachment plate 125 has a leftward projection 40 having cylinder mounting bracket 41 for cylinder 42. Cylinder 42 has a cylinder rod 43 extending through mounting bracket 41 and connected to locking wedge 44.

Attachment plate 125 also has an upward projecting stub shaft 45 threaded into it as best seen in FIG. 4 and configured for limited pivotable support of one bar of the four bar linkage. The first bar of the four bar linkage in this arrangement is bar 46 which, in the illustrated example, has a bronze flanged bearing 47, and is pivotable about stub shaft 45. Bar 46 is retained on stub shaft 45 by a washer 48 and a nut 49. To provide for limited amount of controlled compliance, pivotable bar 46 has a vee notch 50 at its left end, FIG. 3, for accepting locking wedge 44. The distance the locking wedge 44 is pulled out toward the left sets space 51, which is predetermined by design. Space 51 determines the compliance of pivotable extension 23 by determining how much pivotable extension 23 can rotate when bar 46 is released. When cylinder 42 is extended, cylinder rod 43 pushes locking wedge 44 into notch 50 of bar 46, eliminating space 51 and locking pivotable bar 46 in position.

The second bar of the four bar linkage is bar 26, which is pivotally connected to pivotable bar 46 by rod end bearing 52 and pivotally connected to pivotable member 23 by rod end bearing 53. The third bar is bar 27, which is pivotally connected to pivotable bar 46 by rod end bearing 54 and pivotally connected to pivotable member 23 by rod end bearing 55. The fourth bar is the pivotable member 23.

The locking apparatus and vee notch 50 can be located at either end of pivotable bar 46 and achieve intended function. Likewise, pivotable bar 46 and associated lock/release apparatus can be adapted at either end of bars 26 and 27 and perform the same function.

It is noted that the currently preferred position for the releasable element of the four bar linkage is in the bar mounted on or otherwise associated with attachment plate 125 or its equivalent. However, the invention is equally applicable to a releasable bar of the four bar linkage mounted at the opposite end of the linkage, that is rotatably connected to pivotable member 23 or its equivalent. Unless otherwise indicated, both alternatives are intended to be encompassed by the appended claims.

Figure 5:
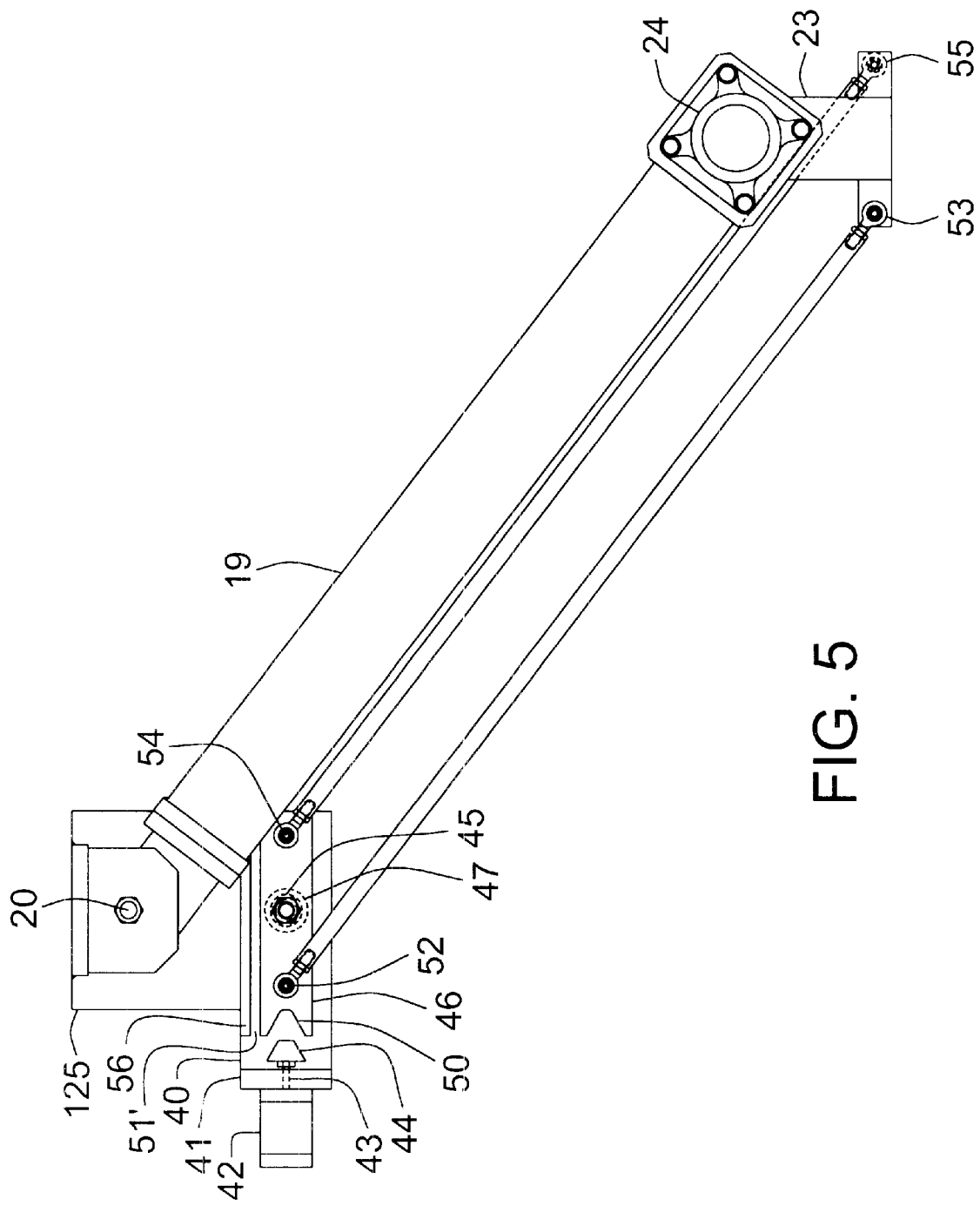
FIG. 5 is the same as FIG. 3 except it embodies the locking mechanism in an alternate form.

FIG. 5 is the same as FIG. 3 except it embodies the locking mechanism and compliance-limiting feature in an alternate form. Items equivalent to those of FIG. 3 are identified with the same numbers. Cylinder 42 of FIG. 5 has a longer stroke, sufficient to pull locking wedge 44 fully from vee notch 50 in the left end of pivotable bar 46. Further, bar 56 has been fixed to plate 125 parallel to pivotable bar 46, when bar 46 is in locked position, at space 51 ' for the purpose of limiting the range of travel of pivotable bar 46 when pivotable bar 46 is released. The left end of bar 56 limits the clockwise pivoting of bar 46 while the right end of bar 56 limits counterclockwise pivoting of bar 46 thus determining the amount of compliance or rotation of pivotable bar 46 and thus of pivotable extension 23.

Figure 6:
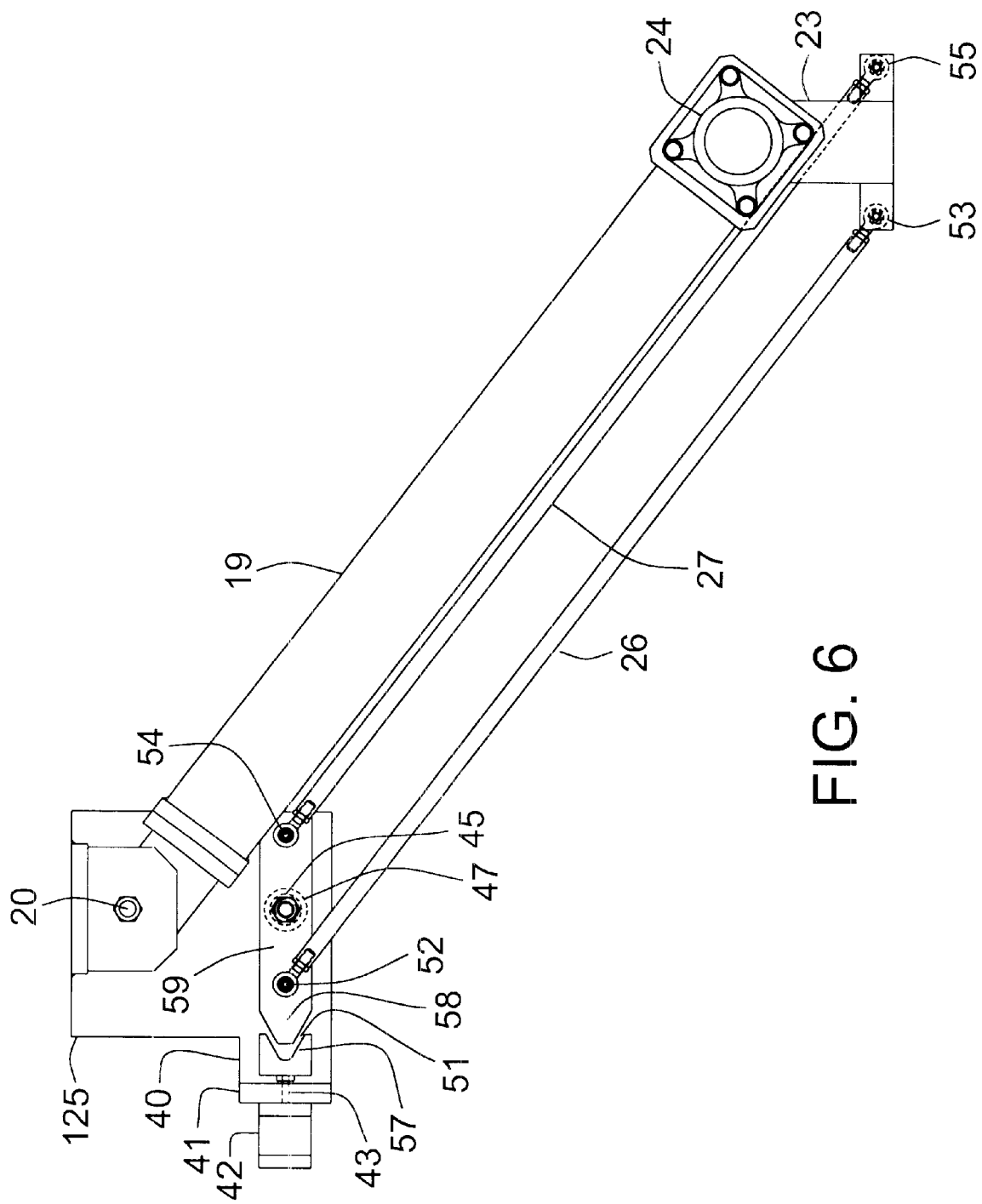
FIG. 6 is the same as FIG. 3 except it embodies the locking mechanism in an alternate form.

FIG. 6 is the same as FIG. 3 except it embodies the locking mechanism in an alternate form. Items equivalent to those of FIG. 3 are identified with same numbers. Shown in released position, cylinder 42 drives, via cylinder rod 43, a vee notched locking block 57 to engage a wedge shaped end 58 of pivotable bar 59, to lock the first bar 59 of a four bar linkage. Space 51 determines the compliance of pivotable extension 23 by determining how much pivotable bar 59 can rotate when pivotable bar 59 is released. When cylinder 42 is extended, cylinder rod 43 pushes locking block 57 over wedge shaped end 58 of bar 59 eliminating space 51 and locking pivotable bar 59 in position. The locking apparatus and wedge shaped end 58 can be located at either end of bar 59 and achieve intended function. Likewise, pivotable bar 59 and associated lock/release apparatus can be adapted at either end of bars 26 and 27 and perform the same function.

Figure 7:
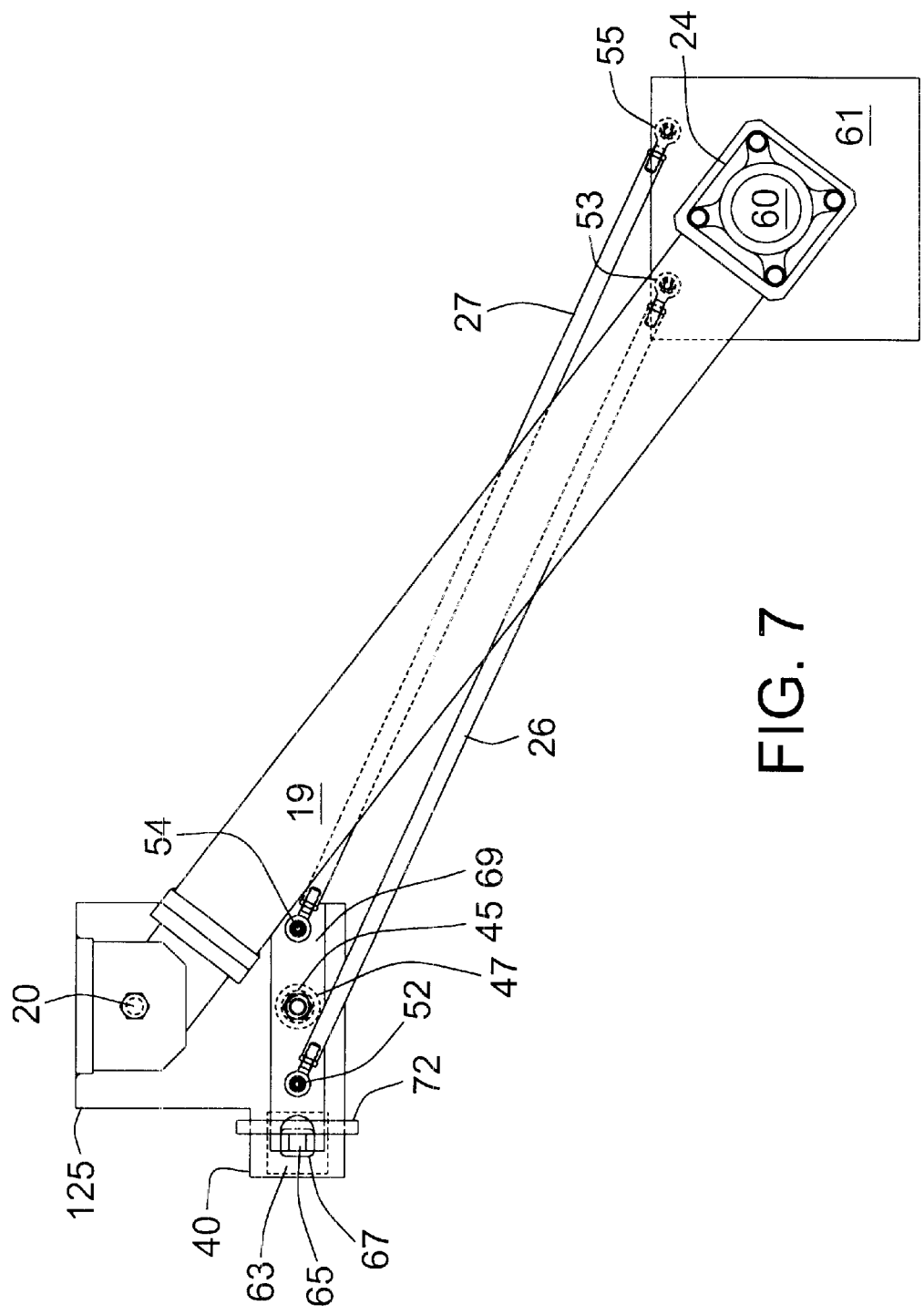
FIG. 7 is similar to FIG. 3 except it embodies a different pivoting apparatus at the distal end of beam 19 and it embodies a locking mechanism in another alternate form.

FIG. 7 is similar to FIG. 3 except it embodies a different pivoting member at the distal end of beam 19 and it embodies a locking mechanism in another alternate form. Items equivalent to those of FIG. 3 are identified with same numbers. At the distal end of pivotable beam 19, supported by two bearings 24, one bearing above beam 19 and one bearing below beam 19, is shaft 60. Plate 61, connected to the lower end of shaft 60, is a pivotable member in the form of a mounting plate, for attaching a platen of a loading apparatus, pivotable about bearings 24.

Figure 8B:
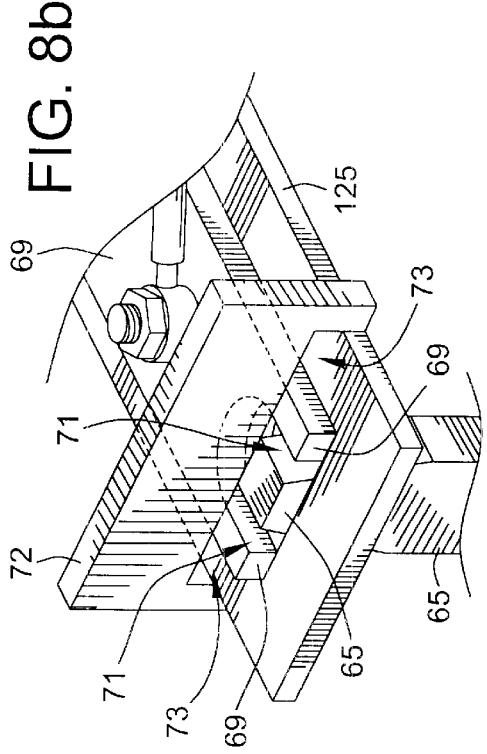
FIGS. 8b and 8c are assembled partial views showing the lock/release mechanism of FIG. 7 in the released and locked position respectively.
Figure 8C:
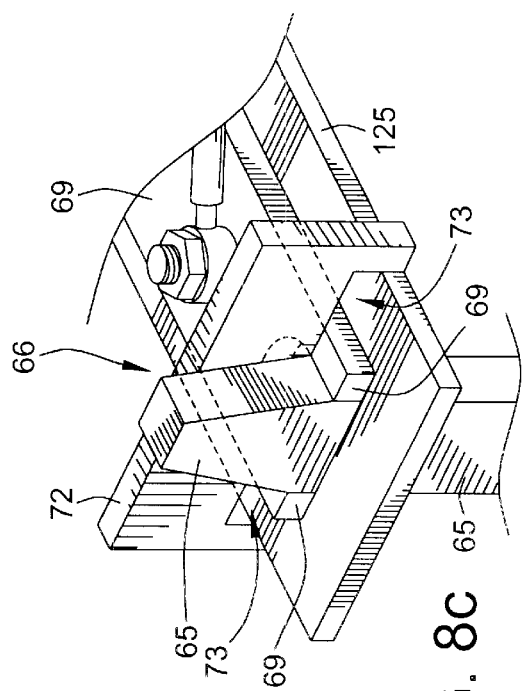
Figure 8A:
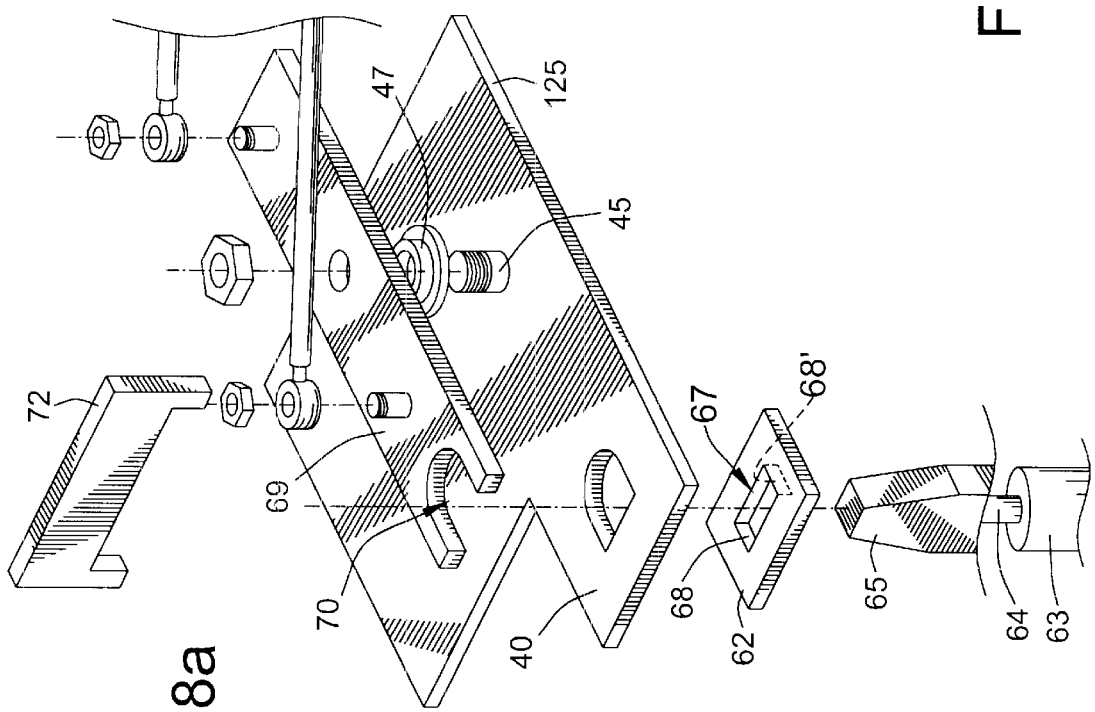
FIG. 8a is an exploded perspective showing the lock/release mechanism of FIG. 7.

The lock/release mechanism of FIG. 7 is best understood by concurrent reference to FIG. 7 and FIGS. 8a–8c. Below leftward projection 40 of attachment plate 125 there is a cylinder mounting plate 62, and a vertically mounted cylinder 63 having a cylinder rod 64 connected to locking wedge 65. The lock/release mechanism is shown with the locking wedge 65 in its raised, locked position in FIG. 8c. FIG. 8b shows the wedge 65 retracted to release the mechanism for limited controlled compliance as will now be described. Locking wedge 65 in released position resides in a rectangular hole 67 having radiused corners and is guided by the sides 68 and 68' of rectangular hole 67. First bar 69 of a four bar linkage has a reversed, vertical "C" shaped slot 70 through its left end, has a bronze flange bearing 47, and is pivotable about stub shaft 45. Space 71 between locking wedge 65 in released position and pivotable bar 69, established by design, determines the amount of compliance or range of rotation of pivotable bar 69 and thus of mounting plate 61 (FIG. 7). A downward directed "C" shaped support block 72 mounted to the leftward of projection 40 of attachment plate 125 such that the inner surface of the "C" shape is proximate to the upper surface of bar 69, supports pivotable bar 69 when the locking wedge is driven by cylinder 63 to its raised locking position 66. Space 73 between bar 69 and inner downward legs of "C" shaped support bar 72 is greater than space 71 allowing space 71 to control the amount of compliance.

In alternate form, space 73 could be made smaller than space 71 such that space 73 would control the amount of compliance. The lock/release mechanism of FIG. 8 could be embodied at either end of bar 69 and accomplish intended function. Also the mechanism could easily be embodied with the cylinder mounted above bar 69. Further it could be easily embodied such that the cylinder locks on the pull stroke and releases on the extend stroke. Further, pivotable bar 69 and associated lock/release apparatus can be adapted at either end of bars 26 and 27 and perform the same function.

In another alternate form of the locking mechanism of FIGS. 7 and 8, locking wedge 65 can be in the form of a pin having a tapered end, the reversed, vertical "C" shaped slot 70 can be in the form of a round hole proximate the left end of pivotable bar 69, the downward directed "C" shaped support block 72 could be spaced slightly to the immediate left or right of the locking pin, and space 71 can be the space between the tapered end of the pin and the inner hole diameter 70 when the locking pin is retracted. Such a form can be adapted in any of the configurations previously described.

FIG. 9 is the loading apparatus of FIG. 2 embodied with the releasable four bar linkage of FIGS. 3 and 4, making the loader adequately compliable to load sheets directly into workclamps 7 and 7'. Items equivalent to those of FIG. 2 are identified with same numbers. Lock/release mechanism 74 is shown in the locked position. Workpiece 17 is shown residing in an angular relationship to X-axis 3 of machine tool 1. Workpiece 17' shows workpiece 17 loaded on worktable 14 and in contact with workclamp registration surfaces 39' and 39 of workclamps 7' and 7.

Operation of the loader of FIG. 9 is as follows. A supply of material 17 is staged on loading apparatus 2 at the right side of machine tool 1. The releasable four bar linkage 74 of loader 2 is locked. When commanded to load a sheet of material, cylinder 30 lowers the vacuum cups 31 to the supply of material 17. A sensor detects the presence of a sheet for pickup, and thereafter vacuum cups 31 ' are engaged to grip the top sheet. Cylinder 30 lifts the load beam 29 picking up the top sheet of material, cylinder 32 pivots cantilevered beam 19 clockwise until the sheet 17' is over worktable 14. Cylinder 30 lowers the load beam 29 and attached sheet 17' to the surface of worktable 14 and the releasable four bar linkage 74 of loader 2 is released. Cylinder 32 pivots cantilevered beam 19 clockwise to urge sheet 17' against workclamp registration surfaces 39 and 39'. Since one of the bars of the four bar linkage is free for limited pivotable movement, the sheet can be slightly reoriented as it engages the workclamps so that it is loaded in registration with both workclamps. Sensors associated with workclamp registration surfaces 39 and 39' detect the sheet is loaded and cause the workclamps 7 and 7' to grip the sheet. Vacuum cups 31' release the sheet, cylinder 30 lifts the load beam 29 and vacuum cups 31' above the sheet, releasable four bar linkage 74 is locked and cylinder 32 pivots cantilevered beam 19 counterclockwise positioning it once more over the staging area.

It is noted that cylinder 32 can be adapted as multiple cylinders. In one form, two single acting cylinders 32 can be adapted, one on each side of cantilevered beam 19, such that each cylinder causes pivotable motion by being operated in one direction, either by extension or by retraction. In another form, multiple cylinders mounted end to end can be adapted on one side of cantilevered beam 19. In this form, the stroke of each cylinder is sufficient to pivot cantilevered beam 19 to a predetermined position.

Figure 11:
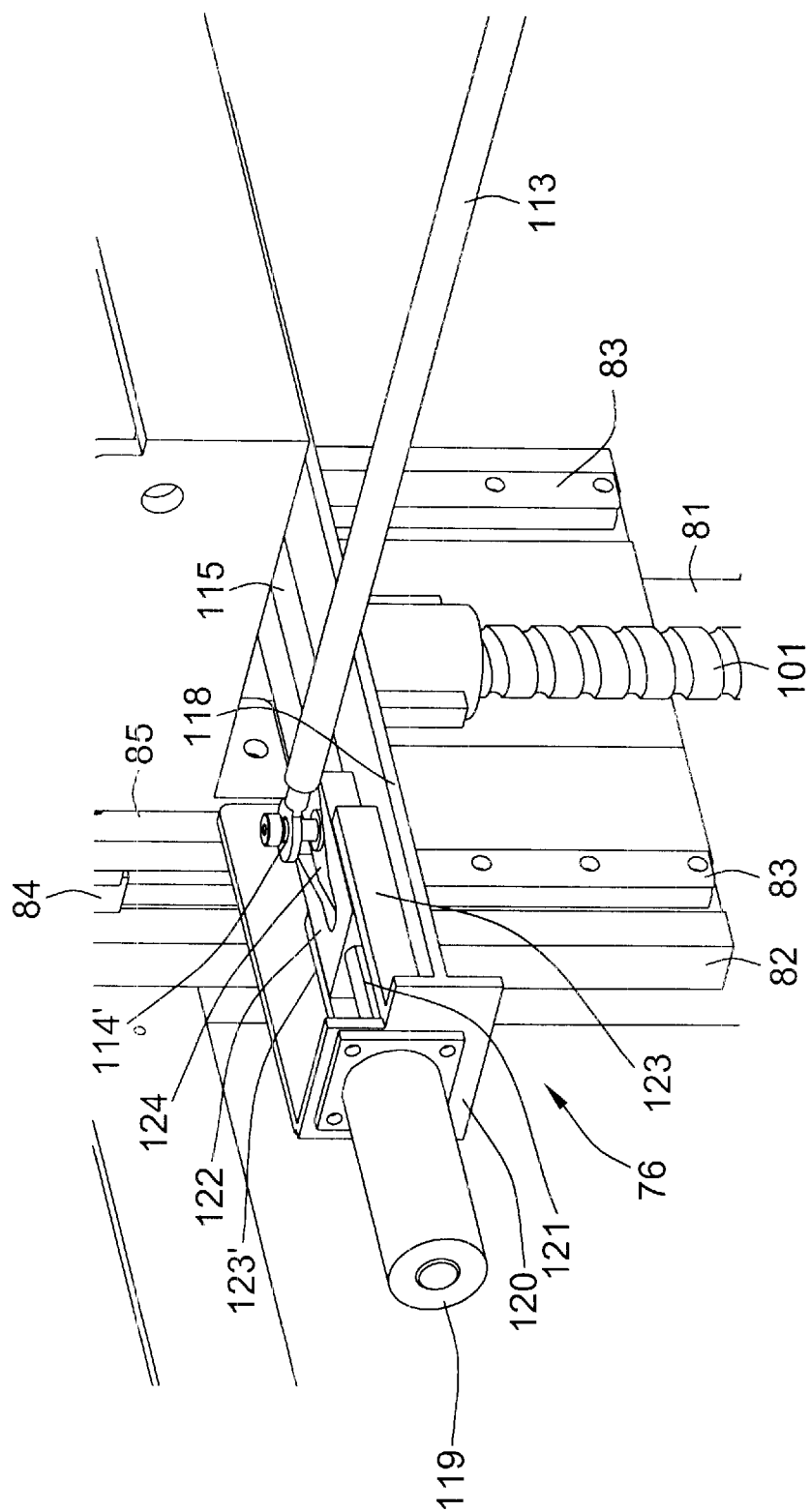
FIG. 11 is an enlarged view of the four bar lock/release mechanism of FIG. 10.

FIG. 10 is a drawing of a loader/unloader apparatus 75 in preferred form having a releasable four bar linkage 76 in preferred form. Loader/unloader 75 is sometimes referred to as loader 75. FIG. 11 is an enlarged view of the lock/release apparatus of releasable four bar linkage 76.

Loader/unloader 75 has a base 77 adapted with several angle brackets 78 adapted with leveling screws 79 and spacer plates 80 for leveling loader/unloader 75 and securing it to the floor. Leveling screws 70 have a hole axially through their center suitable for passage of an anchor bolt (not shown) for securing loader/unloader 75 to the floor.

Freestanding column 81 is attached to base 77. The connection of freestanding column 80 to base 77 is strengthened by several gussets 81. A way mounting plate 82 is attached to one face of freestanding column 80. Attached to way mounting plate 82 are two linear ways 83 having linear guide bearings 84. Attached to linear guide bearings 84 is a mounting plate 85. Attached to mounting plate 85 is a pair of brackets 86 and 86' for supporting and pivotally connecting cantilevered beam 87. Servomotor 88 is adapted to drive the input shaft of gear reducer 89 that is mounted to the upper surface of supporting bracket 86'. Gear reducer 89 is adapted to horizontally pivot cantilevered beam 87.

At the upper end of mounting plate 85 is a "C" shaped bracket 90 pivotally connecting an attachment block 91 about shaft 92. Shaft 92 is concentric with the output shaft of gear reducer 89 for pivoting cantilevered beam 87. "U" shaped bracket 93 is pivotally connected to attachment block 91 by bolt 94. The upper end of support rod 95 is attached to "U" shaped bracket 93. The lower end of support rod 95 is attached to "U" shaped bracket 93' pivotally connected to "U" shaped bracket 96 by bolt 94'. "U" shaped bracket 96 is attached to the distal end of cantilevered beam 87.

Below mounting plate 82, attached to column 81, is a bracket 97 for supporting gear reducer 98 driven by motor 99. Gear Reducer 98 is connected via coupling 100 to the drive shaft of ballscrew 101. Bearing housing 102 supports the lower end of ballscrew 101, a translation screw. Ballnut 103 of ballscrew 101 is connected to the lower end of mounting plate 85. Motor 99 via reducer 98 and coupling 100 drives ballscrew 101 to raise or lower mounting plate 85 and attached apparatus guided by linear bearings 84. Brake 104 holds mounting plate 85 in position when motor 99 is de-energized. Other types of translation screws can be used in place of ballscrew 101.

The cantilevered beam 87 carries at its distal end a pivotable member including plate 109 which in turn supports part handling apparatus generally indicated at 107. More particularly, inverted "V" shaped ring 105 is attached to the lower end of bracket 106, which is attached to the underside of the distal end of cantilevered beam 87. Load beam 107, sometimes called a platen, is connected by spacers 108 to plate 109 and pivotally supported about inverted "V" ring 105 by "V" flanged wheels 110 attached to the upper side of plate 109. Platen 107 is equipped with programmable permanent magnets 111 having variable magnetic attraction force. Permanent magnets 111 are adapted such that the magnetic field strength can be varied or reduced to zero by passing a current through a winding about the magnet. This is a safety feature such that, in event of a power failure, the magnets will not drop a carried part.

A dedicated Programmable Logic Controller, PLC, 112, controls magnets 111. PLC 112, considered a smart device, in response to signals from a CNC control, turns on or off selected magnets 111, controls the magnetic field strength of each magnet 111 and monitors the operation of each magnet.

Pivotable plate 109 is the fourth bar of a releasable four bar linkage. Bar 113, the second bar of the releasable four bar linkage, is pivotally attached to pivotable plate 109 by rod end bearing 114 and pivotally attached proximate the left end of bar 115 (FIG. 11) by rod end bearing 114'.

Bar 116, the third bar of the releasable four bar linkage, is pivotally attached to pivotable plate 109, in like manner as bar 113 but to the opposite side of plate 109, by rod end bearing 117 and pivotally attached proximate the right end of bar 115 by another rod end bearing that cannot be seen.

Pivotable bar 115, the first bar of the releasable four bar linkage, is pivotally connected to bracket 118. The pivotable connection of bar 115 cannot be seen but is similar to that shown in FIGS. 4 and 6 with the pivot center equally spaced from the pivotable connection points of bars 113 and 116. Bracket 118, attached to the lower end of mounting plate 85, supports pivotable bar 115 and lock/release apparatus 76.

Cylinder 119 is flange mounted to plate 120, which is attached to the left end of bracket 118. Rod 121 of cylinder 119 is connected to "V" shaped block 122 to pull it away from bar 115 to release the releasable four bar linkage and push it against bar 115 to lock the releasable four bar linkage. Bars 123 and 123' are attached to the upper side of bracket 118, parallel to pivotable bar 115, when bar 115 is in the locked position, and proximate each side of "V" shaped block 122 to slideably guide "V" shaped block 122 when locking pivotable bar 115. The left end of pivotable bar 115 is adapted with a wedge shaped end 124 matching that of "V" shaped bock 122. "V" shaped block 122 and wedge shaped end of pivotable bar 115 of FIGS. 10 and 11 are similar to vee notched locking block 57 and wedge shaped end 58 of pivotable bar 59 shown in FIG. 6.

Platen 107 is adapted with a sensor apparatus 150 to detect when material is present for pick up and to sense when a sheet picked up and carried by platen 107 has been set on a worktable.

While loader/unloader 75 of FIG. 10 has been shown with a platen 107 adapted with programmable magnets 111, having variable magnetic force, controlled by PLC 112 in response to a Computer Numerical Control, CNC, platen 107 could be adapted with programmable vacuum cups. In such an apparatus, which vacuum cups are turned on or off could be controlled by a PLC in response to the CNC or by the CNC itself.

Figure 12:
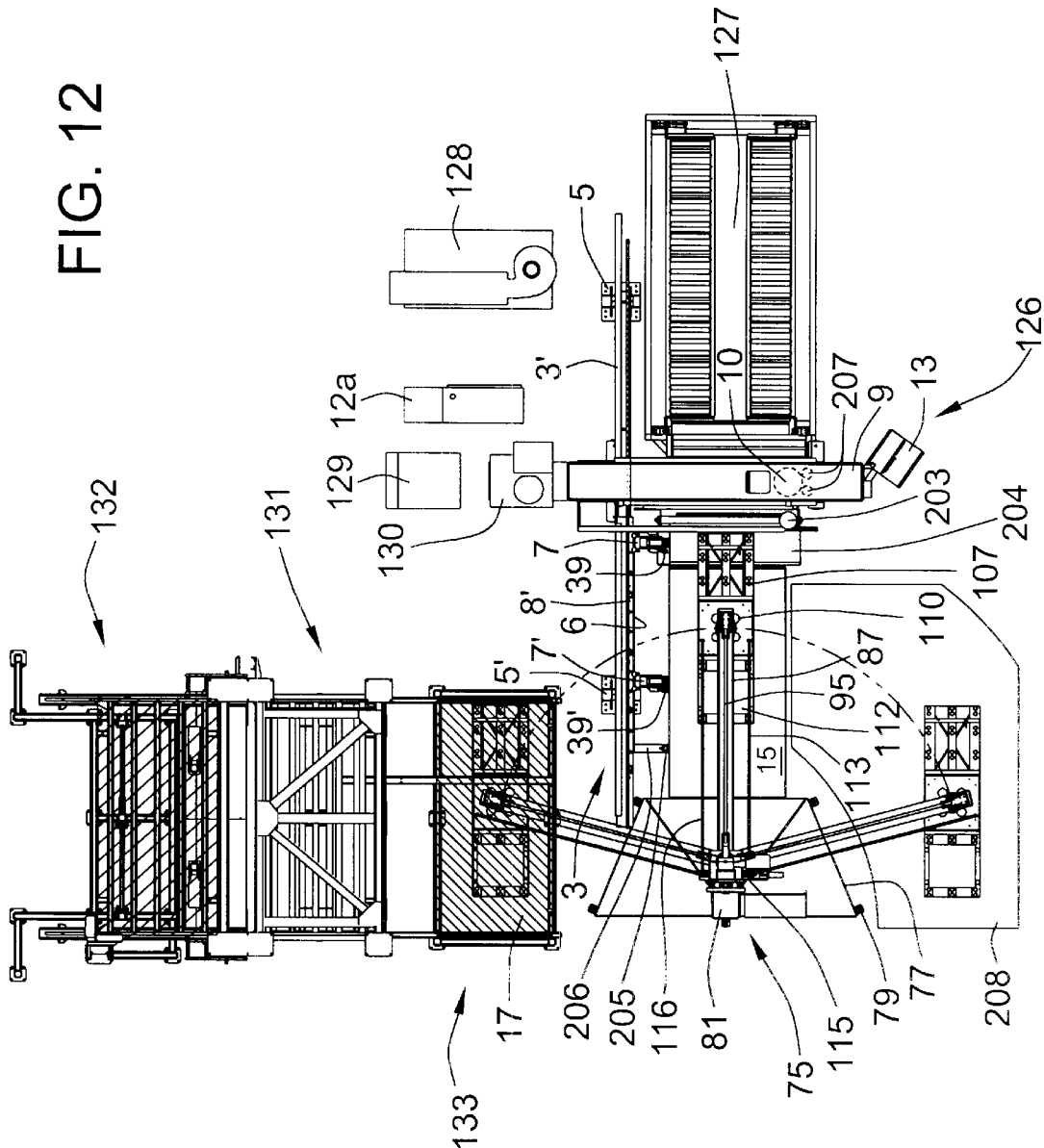
FIG. 12 is a machine tool embodied with the loader/unloader of FIG. 10.

FIG. 12 is a plan view of a machine tool 126 embodied with the preferred loader/unloader 75 of FIGS. 10 and 11. Machine tool 126, a CNC controlled punch press, is like machine tool 1 of FIGS. 1 and 2, except that the punching tool sets 8 of FIGS. 1 & 2 are not shown. Several items equivalent to those of FIGS. 1 and 2 are identified with same numbers. Some items equivalent to those of FIGS. 1 and 2 are not identified to eliminate excessive redundancy.

Alternate embodiments of machine tool 1 and machine tool 126 can be adapted to be a CNC punching machine without a thermal cutting attachment or a thermal cutting machine such as a plasma torch or a laser not having a punching tool. Reference to machine tool 1 and machine tool 126 is intended to apply inclusively to such machines unless the context clearly indicates otherwise.

Alternate embodiments of machine tool 1 and machine tool 126 can be adapted with the thermal cutting attachment on the side opposite that shown or with the loading apparatus on the side opposite that shown. The invention is intended to apply inclusively to such embodiments unless the context clearly indicated otherwise.

Machine tool 126 is adapted to have punching tool sets distributed along the translatable X-axis translatable table 6 in predetermined and numbered positions. 8' of is one of the pockets for holding punching tool sets. The position of the work clamps and punching tool sets can be interchanged. A workclamp can be moved to a position occupied by a punching tool set and the punching tool set can be moved to the position previously occupied by the workclamp.

Upon machine power up or after a change in machine setup the machine operator must run a machine setup program before the machine is used to produce parts. The setup program moves the X-axis table 6 carrying the workclamps 7 and 7' and punching tool sets 8 such that the workclamps 7 and 7' pass over a sensor that detects the position numbers that hold a workclamp. The workclamp positions are stored for future use. Safety zones are then established for each workclamp to prevent collision of a workclamp with the punching cylinder or plasma torch.

Worktable 127 located to the right of frame 9, FIG. 12, is different from worktable 14 of FIGS. 1 and 2. Worktable 127 is described in co-pending patent application of William B. Scott, Joachim Mayer and Michael Dixon, the teachings and disclosure of which are hereby incorporated in their entirety by reference thereto. Worktable 127, also called a scrap table or a scrap table apparatus, is adapted to unload skeletal remnants from machine tool 1 such that they fall through scrap table 24 such that they are stacked on blocks 28 resting on or proximate the floor.

Proximate in front of punching cylinder 10 are two cylinders 207, called reposition cylinders, mounted on the bottom surface of the mounting plate of punching cylinder 10. The function of cylinders 207 is to clamp the sheet or plate being processed by machine tool 126 such that the sheet will not move in the event that the workclamps must be opened and repositioned relative to the sheet.

Behind machine tool 126 is a plasma power pack 129 for operating plasma torch 203 and a dust collector 128 for collecting smoke and dust from operation of plasma torch 203. To the immediate rear of frame 9 is hydraulic power unit 130 of machine tool 126.

The magnetic platen 107 of loader/unloader 75 has it's own PLC 112. The CNC of machine tool 126 communicates with PLC 112 telling it which magnets to use and what magnetic field strength to employ. PLC 112 activates and deactivates magnets 111 accordingly and monitors their operation.

Left of workclamp 7' is a bracket 206 attached to stationary X-axis rail 3'. Photo switch 205 is mounted to bracket 206. Photo switch 205 is of a type like Cutler Hammer E58-30DP150-ELPB. The function of photo switch 205 is to find the left edge of a plate loaded into the workclamps. The description of how this is accomplished will follow later. The CNC has a "fixture offset" position associated to the position of photo switch 205. The CNC also has a "modifier" position associated with photo switch 205 such that the switch does not have to be installed exactly at the "fixture offset" position. The CNC adds the positive or negative "modifier" and the "fixture offset" position to determine exactly where photo switch 205 is installed relative to the X-axis "0".

A smart drive assembly programmed in statement language, such as a VLT 5000 series voltage vector control drive manufactured by Danfoss, positions the Z-axis of loader/unloader 75, driven by motor 99. Motor 99 and associated components are named the Z-Axis because they raise and lower magnetic platen 107. The smart drive closes the motor position loop accomplishing control of the axis independently from the CNC.

The pivoting motion of loader/unloader 75 driven by servomotor 88 and gear reducer 89 is named the W-axis. The pivoting motion is controlled directly by the CNC of machine tool 126. This control scheme is used because of availability within the CNC system of a control function allowing a commanded move to be terminated before reaching the end point of the move and for the remaining move distance to be abandoned or skipped.

To the left rear of machine tool 126 is a material storage tower 131 for storage of various thickness of raw material to be processed. Material storage tower 131 has a loading side 132 and a material staging station 133. Loading side 132 is equipped with an elevator apparatus to store and retrieve pallets of material from the storage tower. The material staging table contains magnetic sheet fanners to assist separation of steel sheets. Material 17 is removed from the storage tower 131 by the elevator then moved by a pallet transfer apparatus to the staging station 133 for loading by loader/unloader 75 to worktable 15, into workclamps 7 and 7', against registration surfaces 39 and 39', for processing by machine tool 126.

In preferred form, material storage tower 131 is controlled by a stand alone PLC. The elevator drive for material storage tower 131 is controlled by a smart drive programmed in statement language, such as a VLT 5000 series voltage vector control drive manufactured by Danfoss. Such a smart drive closes the motor position loop accomplishing control of the axis independently from the PLC. The PLC communicates with the smart drive. These communications request the elevator drive to position the elevator to specified shelf locations. The material storage tower PLC controls the movement of pallets in and out of the shelves of the tower. The material staging apparatus, which moves a pallet from the material tower elevator to the material staging position, is also controlled by the PLC. The CNC of machine tool 126 communicates with the material storage tower PLC requesting a specific action such as delivery of 0.5-inch thick material to the staging position 133. The PLC initiates the action and signals the CNC when that action has been accomplished.

In alternate form, the CNC of machine tool 126 controls material storage tower 131 in place of the stand alone PLC. The elevator drive for material storage tower 131 remains a smart drive programmed in statement language. The CNC communicates with the smart drive. These communications cause the elevator drive to position the elevator to a requested shelf. The CNC controls movement of pallets in and out of the shelves of the material tower 131. The material staging apparatus, which moves a pallet from the material storage tower elevator to the raw material staging position 133 for loading, is also controlled by the CNC via input/output logic.

After a pallet is positioned at the material staging position the CNC communicates with the PLC 112 of magnet platen 107. This communication informs PLC 112 which magnets to activate and what magnetic field strength to develop to ensure a single sheet is picked up.

Once this transmission has been completed between the CNC and the PLC 112, the CNC of machine tool 126 initiates a load cycle. Following is a description of that cycle.

(1) The Z-axis of loader 75 moves to full up position such that magnet platen 107 will clear the rail 3' of X-axis 3.

(2) The X-axis moves the workclamps to a calculated plate load position (((("X"–1)*10.236)+7.244)+28.0) where "X" contains the tool pocket number of the second workclamp (workclamp 7), 10.236 is the distance between tool pockets, 7.244 is the distance from the centerline of the first tool pocket to the centerline of machine tool 126, and 28.0 is an approximate minimum position required to assure the second workclamp (workclamp 7) is in a position to clamp the material. The 28.0 position can be changed to suit installation conditions. Simultaneously, the Y-axis moves the punching cylinder 10 and plasma torch 203 to a safe location out of the way of the loading cycle. Simultaneously, the W axis moves over the material staging position and all magnets 111 are fully de-energized to have no attraction to metal.

(3) When material clamps 7 and 7' reach load position they open.

(4) When the loader W-axis is over the material staging position 133, the loader Z-axis moves down until material 17 is contacted, then stops. Sensor apparatus 150 indicates to the CNC contact with material.

(5) Upon receipt of the contact with material signal, the CNC will command platen PLC 112 to perform all of it's internal checks. All other signals to PLC 112 are off. PLC 112 activates all previously selected magnets at specified magnetic field strength, and all other magnets to the off or fully deactivated magnetic field strength level. This allows the platen to lift one and only one plate. When PLC 112 verifies that all magnets are properly seated and energized to specified magnetic field strength, PLC 112 communicates an "ok to go"-signal to the CNC.

(6) Upon receipt of the "ok to go" signal, the CNC commands the smart drive of loader 75 to move the Z-axis up. At a pre-designated time, when magnet platen 107 is far enough away from the top of the material stack that switching all magnets to high power will not cause the platen to pick up a second sheet, the CNC commands PLC 112 to energize all magnets to full magnetic field strength. Tentatively, the time is set to three seconds after the start of the up move. If the Z-axis reaches full up position before the magnets have been energized to full field strength, the CNC commands PLC 112 to energize all magnets to full magnetic field strength at full up position.

(7) With platen 107 at full up position, sensor apparatus 150 communicating that the sheet is held by the platen, and PLC 112 communicating that all magnets are at full field strength, the CNC moves the loader W-axis to a position over worktable 15 such that the rear edge of the sheet is forward of workclamps 7 and 7' then stops.

(8) The CNC commands the smart drive of loader 75 Z-axis to lower platen 107. Z-axis motion stops when the sensor apparatus 150 indicates the material has reached the surface of worktable 15 or when the distance to the table has been traveled.

(9) The CNC releases locking apparatus 76 of loader 75 to allow the sheet to align with workclamps 7 and 7' against sensors 39 and 39' and moves the loader W-axis toward the open workclamps.

(10) When sensors 39 and 39' detect the material is against the registration surfaces of workclamps 7 and 7' W axis motion is halted and workclamps 7 and 7' are closed.

(11) When the clamps have closed the CNC commands platen PLC 112 to de-energize all magnets 111 to zero magnetic field strength to release the plate.

(12) PLC 112 communicates to the CNC that all magnets are at zero magnetic field strength then the CNC commands the smart drive of loader 75 Z-axis to move to the full up position. This full up position, above worktable 15 is the standby position of loader/unloader 75.

(13) The smart drive of loader 75 Z-axis signals the CNC that the Z-axis is at the full up position, then the CNC commands PLC 112 to energize all magnets to fall strength to conserve power and the CNC will initiate finding the leading edge of the material loaded in workclamps 7 and 7'.

(14) The CNC moves the X-axis table 6 carrying the workclamps 7 and 7' and the clamped sheet or plate in a series of incremental moves such that the position of the left edge of the sheet relative to X "0" is accurately determined by sensor 205. If photo sensor 205 detects the plate, the first of the series of moves is to the right, X minus, until photo sensor 205 loses the plate. If photo sensor 205 does not detect the plate, the first of the series of moves is to the left, X plus, until photo sensor 205 detects the plate. The CNC then reverses the direction of travel of the X-axis, reduces the move velocity and reduces the move increment to a smaller step such that photo sensor 205 changes state. This process is repeated several times with direction changes and smaller increment steps until the location of the edge of the sheet in the X-axis is accurately determined.

(15) The CNC then calculates the position of the edge of the plate relative to the X-axis zero position. The CNC uses this calculated position to reposition the workclamps relative to the plate.

(16) The CNC moves the X and Y-axes to a position such that reposition cylinders 207 can clamp the sheet during repositioning of the workclamps.

(17) The CNC initiates reposition cylinders 207 to clamp the plate.

(18) The CNC initiates opening workclamps 7 and 7' thereby releasing the plate from the X-axis.

(19) The CNC moves the X-axis to reposition workclamps 7 and 7' such that when the work clamps are closed and the X-axis is moved to X "0", the edge of the sheet is accurately positioned relative to the X centerline of punching cylinder 10.

(20) The CNC initiates closure of workclamps 7 and 7' to grip the plate.

(21) The CNC initiates reposition cylinders 207 to retract to their full up position.

(22) The sheet or plate is now fully gauged and ready for processing by machine tool 126.

Machine tool 126 processes the sheet such that all punching operations are performed; then any larger holes are cut with the plasma torch. Afterward, the plasma torch cuts individual parts from the sheet. Small parts are unloaded from the machine via drop leaf table 204. Parts too large for the drop leaf table are unloaded by loader/unloader 75.

An unloading zone 208, FIG. 12 outlines an area for unloaded large parts. The unloading function can stack parts on a table or on pallets or drop parts into containers located within zone 208.

When a part too large for drop leaf table 204 is cut out by plasma torch 203 the CNC moves the W-axis of loader 75 to position platen 107 over worktable 15 such that magnets 111 are over the large part to be removed then stops. The CNC commands PLC 112 to reduce the magnetic field of all magnets to "0". When PLC 112 signals the CNC that all magnets are at "0" magnetic field strength the CNC commands the smart drive of loader 75 to move the Z-axis of loader 75 down until sensor apparatus 150 indicates to the CNC that the material has been contacted. The CNC instructs PLC 112 which magnets to energize and what magnetic field strength to employ. PLC 112 energizes the requested magnets then sends an "ok to go" signal to the CNC. Upon receipt of the "ok to go" signal, the CNC commands the smart drive of loader 75 to move the Z-axis up. At a pre-designated time, when magnet platen 107 has been raised above the material and if the magnetic fields are not already at full strength, the CNC commands PLC 112 to energize the previously selected magnets 111 to full magnetic field strength. Tentatively, the time is set to two seconds after the start of the up move. If the Z-axis reaches full up position before the magnets have been energized to full field strength, the CNC commands PLC 112 to energize the previously selected magnets to full magnetic field strength at full up position. With platen 107 at full up position, sensor apparatus 150 communicating that the part is held by the platen, and PLC 112 communicating that the selected magnets are at full field strength, the CNC moves the loader W-axis to a commanded position over unloading zone 208 then stops. When the part has been moved horizontally clear of worktable 15, the CNC restarts processing the part program controlling machine tool 126. The CNC will either drop the part into a container or stack the part on a table or pallet.

If the command is to drop the part, the CNC will command PLC 112 to reduce the magnetic field strength of the selected magnets 111 to "0". When the CNC receives a signal from PLC 112 that the magnetic field strength is at "0" and receives confirmation from sensor apparatus 150 that magnets 111 no longer hold the part, the CNC commands PLC 112 to energize all magnets to fall strength, to conserve power, and moves the loader W-axis back to the standby position over worktable 15.

If the command is to stack the part, the CNC commands the smart drive of loader 75 Z-axis to lower platen 107. Z-axis motion stops when the sensor apparatus 150 indicates the material has reached the surface of the pallet, table, or stack. Upon receipt of the contact signal, the CNC will command platen PLC 112 to reduce the magnetic field strength of the selected magnets to "0". When the CNC receives a signal from PLC 112 that the magnetic field strength of all magnets is at "0" magnetic field the CNC commands the smart drive of loader 75 Z-axis to move to the full up position. The smart drive of loader 75 Z-axis signals the CNC that the Z-axis is at the full up position then the CNC commands PLC 112 to energize all magnets to full magnetic field strength to conserve power and moves the loader W-axis back to the standby position over worktable 15.

Figure 13:
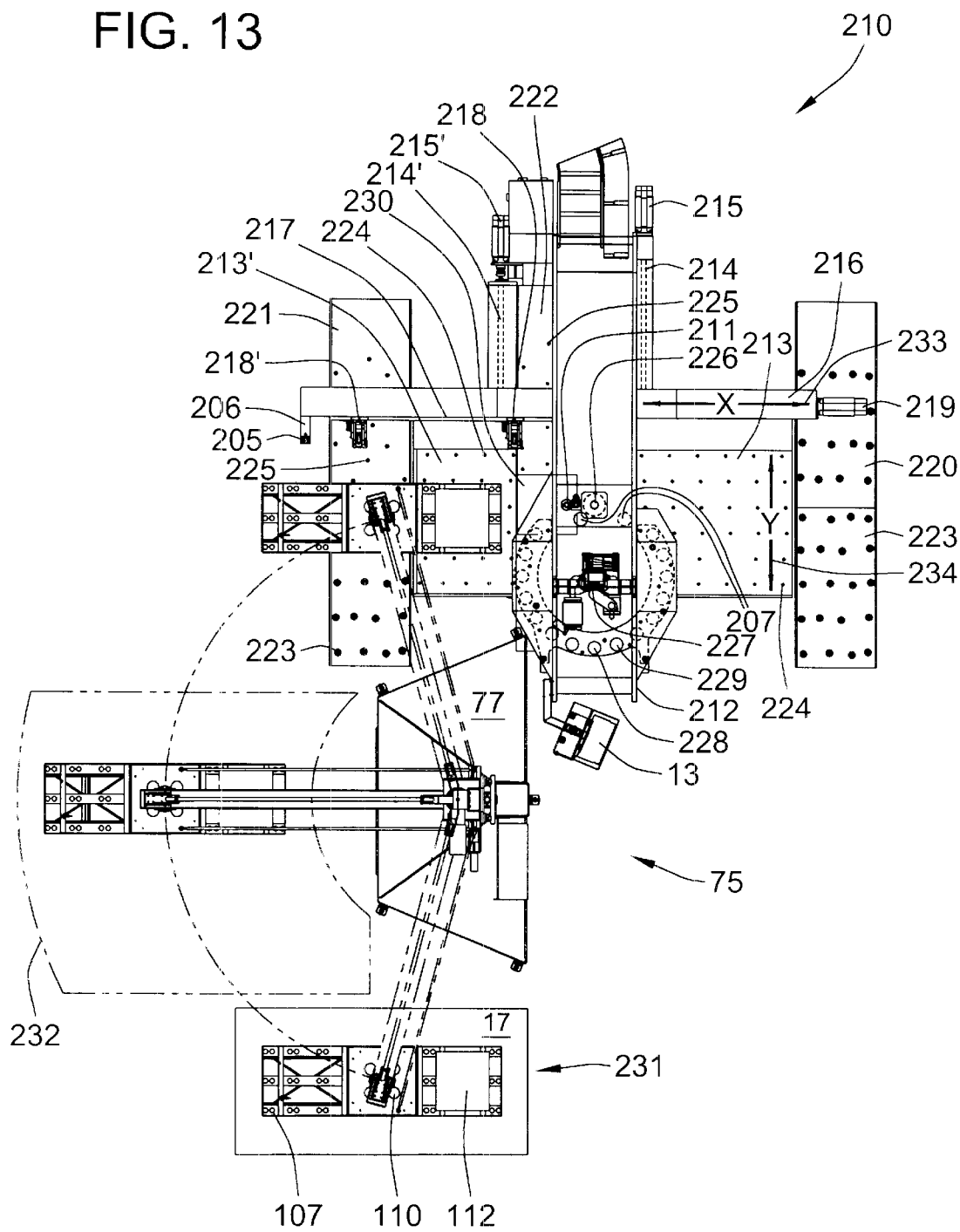
FIG. 13 is an alternate form of a CNC punch press having a plasma torch thermal cutting apparatus and adapted such that the workpiece moves in both the X and Y-axis and adapted with the loader/unloader of FIGS. 10 and 11.

FIG. 13 is an alternate form of a CNC punch press 210 having a plasma torch thermal cutting apparatus 211 and adapted such that the workpiece moves in both the X and Y-axis and adapted a loader/unloader 75 like that of FIGS. 10 and 11. Some items equivalent to those of FIGS. 10 and 11 are identified with same numbers. Some components associated with CNC punch press 210 are not shown as they are not important to the invention. For example a power island, electrical cabinet, plasma power pack and dust collector are not shown.

CNC punch press 210 has a frame 212 shaped somewhat like a rectangular letter "O" when viewed from the side. Frame 212 has a lower base member to which is attached linear ways, which cannot be seen, which carry translatable worktables 213 on the right and 213' on the left, driven by two ballscrews 214 and 214' driven by servomotors 215 and 215'. Attached to the upper rear of worktables 213 and 213' is a X-axis rail 216 to which is attached a linear way, which cannot be seen, carrying a translatable X-axis table 217 carrying workclamps 218 and 218'. X-axis table 217 is driven by a ballscrew, which cannot be seen, which is driven by servomotor 219. Workclamps 218 and 218' have registration surfaces for locating a workpiece in the Y-axis and sensors adapted to sense when a workpiece is loaded against the registration surfaces.

To the right of translatable worktable 213 is a fixed worktable 220. To the left of translatable worktable 213' is a fixed worktable 221. Proximate the center of frame is a fixed worktable 222. Worktables 213, 213', 220, 221, and 222 are adapted with ball transfer bearings 223, 224, and 225. Ball transfer bearings 225 are spring loaded such that they retract when depressed by a workclamp. Ball transfer bearings 223 and 224 are fixed in place.

CNC punch press 210 is adapted such that the Y-axis carries the X-axis. A workpiece, gripped by workclamps 218 and 218' is positioned in the X-axis 233 by servomotor 219 and is carried, at least partially, on translatable worktables 213 and 213' as it is positioned in the Y-axis 234 by servomotors 215 and 215'.

CNC punch press 210 is adapted with a punching cylinder 226 and a robotic tool changer 227 that moves tool sets between the punching cylinder and storage areas 228 arrayed on shelves 229. Proximate in front and to each side of punching cylinder 226 are two reposition cylinders 207. To the left of plasma torch 211 is a drop leaf table 230. Drop leaf table 230 unloads small parts after they are cut from a workpiece by plasma torch 211.

To the left of workclamp 218' is a bracket 206 attached to X-axis rail 216. Photo switch 205 is mounted to bracket 206.

Photo switch 205 is of a type like Cutler Hammer E58-30DP150-ELPB. The function of photo switch 205 is to find the left edge of a plate loaded into the workclamps.

Operator station 13 provides the man/machine interface for machine tool 210.

Loader/unloader 75 is adapted with a material staging station 231 and large parts unload area 232. Material staging station 231 can be a material staging station of a material storage tower.

Operation of the system is similar to that previously described. The CNC of punch press 210 positions the X and Y-axis to a "load position". The X and Y-axis remain stationary while the workpiece is loaded into workclamps 218 and 218'. Loader 75 loads a workpiece on worktables 213 and 221 and into the registration surfaces of workclamps 218 and 218'. The workclamps close gripping the workpiece then the loader releases the part and returns to "standby position". The CNC moves the workpiece in the X-axis such that photo switch 205 finds the location of the left edge of the workpiece then positions the workpiece under reposition cylinders 207. Reposition cylinders 207 grip the workpiece while the workclamps are repositioned such that the workpiece is fully registered and ready for processing by machine tool 210.

The large part unloading cycle functions as previously described.

While loader apparatuses with releasable four bar linkages have been described for use with a CNC punch press machine tool, similar loaders with releasable four bar linkages can be adapted to load different types of machine tools where the part must be aligned with an axis, table or fixture of the machine tool during loading. The requirement is that the axis, table, or fixture has a surface to set the material, part, or some portion of the loading platen apparatus against to align the part to the axis.

It can now be seen by one of ordinary skill in the art that the present invention provides a new and improved machine tool loading apparatus. Means to add compliance to a loader with a releasable four bar linkage and several forms of four bar lock/release apparatuses have been described. A loading cycle has been described, which is capable of automatically picking up a single sheet from a staging station, loading the sheet into the workclamps of the machine tool, locating the position of the sheet on one axis of the machine tool, moving the sheet to the processing area of the machine tool, and repositioning the workclamps of the machine tool relative to the sheet such that the sheet or plate is fully gauged and ready for automatic processing by the machine tool. An unloading cycle has been described such that the loader can also be used to unload large parts from the machine tool. The preferred loader/unloader apparatus has been shown adapted to two types of CNC punch presses. Such adaptations may or may not include a material storage tower apparatus.

What is claimed is:

1. A loading apparatus for loading workpieces from a supply into a machine tool, and comprising in combination:
   a pivotable beam carried on a first end by a support and having a part handling apparatus supported by a second end;
   the beam being pivotable through a range of positions including a supply position for pickup of workpieces and a load position for deposit of workpieces;
   a four bar linkage interposed between the support and the second end of the beam for controlling the orientation of a carried workpiece as it is pivoted from the supply position to the load position; and
   a controllable compliance actuator and release associated with the four bar linkage which, when released, allows limited reorientation of the workpiece for registration of the workpiece in the load position.

2. A loading apparatus for a machine tool comprising in combination:
   a base associated with a free standing column;
   said free standing column adapted to support a power driven pivotable cantilevered beam;
   said cantilevered beam carrying, proximate a distal end thereof, a pivotable member supporting a part handling apparatus adapted to engage and disengage a part;
   a powered lifting apparatus adapted to provide lifting and lowering motion to said part handling apparatus; and
   said pivotable member being controllably stabilized by a four bar linkage which is releasable to add controlled compliance to said machine tool loading apparatus.

3. The loading apparatus of claim 2 in which the four bar linkage includes a releasable latch having a first position in which the four bar linkage is locked and a second position in which the four bar linkage is released to add said controlled compliance.

4. The loading apparatus of claim 3 further including a numerical control connected to operate the latch in at least two conditions including:
   (a) maintaining the latched condition so that the four bar linkage is locked when the power driven pivotable cantilevered beam is pivoted to load a new part, and
   (b) releasing said latch for bringing a new part into registration in the machine tool.

5. The loading apparatus of claim 2 in which the four bar linkage has a first bar fixed with respect to the free standing column, a second bar fixed with respect to the part handling apparatus, and third and fourth bars connecting the first and second bars, one of the first or second bars comprising a releasable bar which is controllably releasable with respect to its fixed member, and a latch mechanism associated with the releasable bar for controllably releasing the bar to allow limited reorientation of the part with respect to the machine tool.

6. The loading apparatus of claim 5 wherein the releasable bar comprises a pivotable link mounted for pivoting intermediate connecting points for the third and fourth bars, the pivotable link having a vee notch at one end thereof, the release mechanism having a cylinder connected to and driving a locking wedge which engages said vee notch to lock the pivotable link from pivoting thereby locking the four bar linkage, and to disengage said vee notch to release said pivotable link to pivot and add controlled compliance to the loading apparatus.

7. The loading apparatus of claim 5 wherein said pivotable link is configured at one end with a wedge shaped end, said lock/release mechanism having a cylinder connected to and driving a vee notched locking block to engage said wedge shaped end (a) to release said pivotable link from pivoting and (b) to disengage said wedge shaped end to release said pivotable link to pivot to add controlled compliance to said loading apparatus.

8. The loading apparatus of claim 6 wherein the amount of said controlled compliance is defined by a space between the wedge and the vee notch when said cylinder is in the disengaged position.

9. The loading apparatus of claim 7 wherein the amount of said controlled compliance is defined by a space between the wedge and the vee notch when said cylinder is in the disengaged position.

10. The loading apparatus of claim 6 wherein the amount of the controlled compliance is determined by a bar mounted proximately parallel to and spaced from said pivotable link, said space controlling the amount of compliance of said loading apparatus when said cylinder is in said disengaged position.

11. The loading apparatus of claim 7 wherein the amount of the controlled compliance is determined by a bar mounted proximately parallel to and spaced from said pivotable link, said space controlling the amount of compliance of said loading apparatus when said cylinder is in said disengaged position.

12. The loading apparatus of claim 5 wherein the releasable bar comprises a pivotable link mounted for pivoting about a point intermediate connecting points for the third and fourth bars and adapted at one end with a vertical "C" shaped notch, the release mechanism having a vertically mounted cylinder connected to and driving a locking wedge which engages the "C" shaped notch to lock the pivotable link from pivoting thereby removing controlled compliance, and to disengage the "C" shaped notch to release the pivotable link for pivoting thereby to add controlled compliance to the loading apparatus, wherein the amount of controlled compliance is defined by a space between the locking wedge and said "C" shaped notch when the cylinder is in the disengaged position.

13. The loading apparatus of claim 5 wherein the releasable bar comprises a pivotable link mounted for pivoting about a point intermediate connecting points for the third and fourth bars, said pivotable link having an aperture at one end thereof, the release mechanism having a vertically mounted cylinder connected to and driving a tapered locking pin to engage the aperture to lock the pivotable link and thereby remove controlled compliance from the loader, and to disengage the tapered locking pin from the aperture to release said pivotable link for pivoting thereby to add controlled compliance to the loading apparatus, wherein the amount of controlled compliance is defined by a space between the tapered pin and the aperture when the cylinder is in said disengaged position.

14. A loading apparatus for a machine tool comprising in combination;
 a base supporting a freestanding column;
 said freestanding column adapted to support a power driven pivotable cantilevered beam;
 said pivotable cantilevered beam carrying proximate a distal end thereof a pivotable member supporting a part handling apparatus adapted to engage and disengage a part;
 a powered lifting apparatus adapted to provide lifting and lowering motion to said part handling apparatus;
 said pivotal member being controllably stabilized by a releasable four bar linkage which is releasable to add controlled compliance to said machine tool loader apparatus;
 a mounting plate supported by the column and supporting said releasable four bar linkage;
 said releasable four bar linkage apparatus being interposed between said pivotable apparatus and said mounting plate;
 one of the bars of the four bar linkage comprising a pivotable link supported for controlled pivoting on a shaft;
 said pivotable link having one end thereof configured for engagement by a lock/release mechanism;
 said lock/release mechanism being associated with said relesable four bar linkage and adapted to engage said pivotable link to remove controlled compliance from said machine tool loader apparatus, and to disengage said pivotable link to add controlled compliance to said machine tool loader apparatus; and
 stops associated with the lock/release mechanism which control the amount of controlled compliance when said lock/release mechanism is in said disengaged position.

15. The loading apparatus of claim 14 wherein said pivotable link has a vee notch at one end thereof, said lock/release mechanism having a cylinder connected to and driving a locking wedge (a) to engage said vee notch to lock said pivotable link from pivoting and (b) to disengage said vee notch to release said pivotable link to pivot to add controlled compliance to said loading apparatus.

16. The loading apparatus of claim 15 wherein the amount of said controlled compliance is defined by a space between said locking wedge and said vee notch when said cylinder is in said disengaged position.

17. The loading apparatus of claim 15 wherein the amount of said controlled compliance is determined by a bar mounted proximately parallel to and spaced from said pivotable link, said space controlling the amount of compliance of said loading apparatus when said cylinder is in said disengaged position.

18. The loading apparatus of claim 14 wherein said pivotable link is configured at one end with a wedge shaped end, said lock/release mechanism having a cylinder connected to and driving a vee notched locking block to engage said wedge shaped end (a) to lock said pivotable link from pivoting and (b) to disengage said wedge shaped end to release said pivotable link to pivot to add controlled compliance to said loading apparatus, wherein the amount of said controlled compliance is defined by a space between said vee notched locking block and said wedge shaped end when said cylinder is in said disengaged position.

19. The loading apparatus of claim 14 wherein said pivotable link has a vertical "C" shaped notch formed at one end thereof, said lock/release mechanism having a cylinder connected to and driving a locking wedge to engage said "C" shaped notch (a) to lock said pivotable link from pivoting and (b) to disengage said "C" shaped notch to release said pivotable link to pivot to add controlled compliance to said loading apparatus, wherein the amount of said controlled compliance is defined by a space between said locking wedge and said "C" shaped notch when said cylinder is in said disengaged position.

20. The loading apparatus of claim 14 wherein said pivotable link has an aperture formed therein proximate one end thereof, said lock/release mechanism having a cylinder connected to and driving a tapered locking pin to engage said aperture (a) to lock said pivotable link from pivoting and (b) to disengage said tapered locking pin from said aperture to release said pivotable link to pivot to add controlled compliance to said loading apparatus, wherein the amount of said controlled compliance is defined by a space between said tapered pin and said aperture when said cylinder is in said disengaged position.

21. The loading apparatus of claim 14 wherein said base is adapted to be leveled and anchored to the floor.

22. The loading apparatus of claim 14 wherein said mounting plate is attached to said freestanding column.

23. The loading apparatus of claim 14 wherein said mounting plate is attached to a secondary mounting plate, said secondary mounting plate configured for vertical translation and adapted to carry said pivotable cantilevered beam.

24. The loading apparatus of claim 14 including at least one cylinder for pivoting the cantilevered beam.

25. The loading apparatus of claim 14 including a motor for pivoting the cantilevered beam.

26. The loading apparatus of claim 14 including a shaft of a reduction apparatus driven by a motor for pivoting the cantilevered beam.

27. The loading apparatus of claim 26 wherein said motor is a servomotor and said servomotor is controlled in response to a numerically controlled machine tool.

28. The loading apparatus of claim 14 wherein said powered lifting apparatus includes at least one cylinder.

29. The loading apparatus of claim 14 wherein said powered lifting apparatus includes a motor.

30. The loading apparatus of claim 14 wherein said powered lifting apparatus includes a translation screw, a reducer apparatus adapted to drive said translation screw, a motor adapted to drive said reducer apparatus, and a brake apparatus adapted to hold said powered lifting apparatus in position when said motor is de-energized.

31. The loading apparatus of claim 30 wherein said motor is driven by a smart drive in response to communication from a machine tool numerical control.

32. The loading apparatus of claim 14 wherein said part handling apparatus includes an array of vacuum cups.

33. The-combination loading apparatus of claim 14 wherein said part handling apparatus includes a load beam arrayed with vacuum cups.

34. The loading apparatus of claim 14 wherein said part handling apparatus includes an array of controllable magnets.

35. The-combination loading apparatus of claim 14 wherein said part handling apparatus includes a load beam arrayed with permanent magnets, said permanent magnets configured such that the magnetic field strength of any magnet and of any combination of magnets can be varied and can be reduced to substantially zero for releasing a part, said permanent magnets controlled and monitored by a PLC, said PLC adapted to control and monitor said permanent magnets individually.

36. The loading apparatus of claim 35 wherein said PLC is adapted to communicate with a CNC control.

37. The-combination loading apparatus of claim 14 including a sensor associated with said part handling apparatus to detect when a part is positioned for pickup and to sense when a part has been set on a worktable of the machine tool.

38. A loading apparatus for a machine tool comprising in combination;
    a base supporting a freestanding column;
    said freestanding column adapted to support a pivotable cantilevered beam at a first end thereof;
    said pivotable cantilevered beam pivotable by at least one cylinder;
    said pivotable cantilevered beam carrying proximate a second end thereof a pivotable member;
    said pivotal member carrying a part handling apparatus adapted to engage and disengage a part and having at least one cylinder to cause lifting and lowering motion to said part handling apparatus;
    said part handling apparatus comprising a load beam arrayed with vacuum cups;
    said pivotal member being stabilized by a releasable four bar linkage which is releasable to add controlled compliance to said machine tool loader apparatus;
    said releasable four bar linkage being interposed between said pivotable member and a mounting plate attached to said free standing column;
    one of the bars of the four bar linkage comprising a pivotable link pivotable about a shaft for adding said controlled compliance to the loading apparatus;
    one end of said pivotable link being wedge shaped;
    said lock/release mechanism having a horizontally mounted cylinder connected to and driving a vee notched locking block to engage said wedge shaped end (a) to lock said pivotable link from pivoting and (b) to disengage said wedge shaped end to release said pivotable link to pivot to add controlled compliance to said loading apparatus;
    wherein amount of said controlled compliance is defined by the space between said vee notched locking block and said wedge shaped end when said cylinder is in said disengaged position;
    said loading apparatus associated with a CNC punch press having an automatic tool changer apparatus and a thermal cutting apparatus.

39. The-combination loading apparatus of claim 38 wherein said shaft and said lock/release mechanism are supported on said mounting plate attached to said freestanding column.

40. A loading apparatus for a machine tool comprising in combination;
    a base supporting a freestanding column;
    said freestanding column carrying vertical linear ways;
    said linear ways supporting a secondary mounting plate which carries a pivotable cantilevered beam;
    said pivotable cantilevered beam pivotable under the control of servomotor responsive to a numerical control of a numerical control machine tool;
    said pivotable cantilevered beam carrying proximate a distal end thereof a pivotable member;
    said pivotal member carrying a part handling apparatus including a load beam arrayed with permanent magnets;
    a sensor apparatus associated with said part handling apparatus to detect when a sheet is present for pick up and to sense when a sheet has been set on a worktable;
    said permanent magnets being controllable by a PLC such that the magnetic field strength of any magnet and of any combination of magnets can be varied and can be reduced to substantially zero for releasing a carried sheet;
    said PLC adapted to control and monitor said permanent magnets individually in response to communication with the numerical control of the numerical control machine tool;
    a powered lifting apparatus adapted to provide lifting and lowering motion to said secondary mounting plate;
    said powered lifting apparatus including a translation screw, a reducer adapted to drive said translation screw, a motor adapted to drive said reducer, a brake adapted to hold said powered lifting apparatus in position when said motor is de-energized, said motor driven by a smart drive in response to communication with the numerical control of the numerical control machine tool;
    said pivotable member stabilized by a releasable four bar linkage which is releasable to add controlled compliance to said machine tool loader apparatus, and having a lock/release mechanism;
    said releasable four bar linkage being interposed between said pivotable member and a mounting plate supported by said secondary mounting plate;

a first bar of the four bar linkage comprising a pivotable link pivotable about its proximate center on a shaft supported on said mounting plate;

said pivotable link having a wedge shaped end;

said lock/release mechanism being supported on said mounting plate and having a horizontally mounted cylinder connected to and driving a vee notched locking block to engage said wedge shaped end (a) to lock said pivotable link from pivoting and (b) to disengage said wedge shaped end to release said pivotable link to pivot to add controlled compliance to said loading apparatus;

wherein the amount of said controlled compliance is defined by the space between said vee notched locking block and said wedge shaped end when said cylinder is in said disengaged position;

said loading apparatus associated with a numerical control machine tool having an automatic tool changer apparatus and a thermal cutting apparatus.

41. A loading/unloading apparatus associated with a machine tool having a numerical control and comprising in combination;

a base supported by a freestanding column, said freestanding column adapted to support a pivotable cantilevered beam, said pivotable cantilevered beam pivotable by a servo controlled by said numerical control, said pivotable cantilevered beam carrying proximate a distal end thereof a pivotable member which carries a part handling apparatus adapted to engage and disengage a part, a sensor apparatus associated with said part handling apparatus to detect when material is present for pick up and to sense when a sheet has been set on a worktable, a powered lifting apparatus providing lifting and lowering motion to said part handling apparatus, said pivotal member being stabilized by a releasable four bar linkage which is releasable to add controlled compliance to said machine tool loader apparatus, a mounting plate associated with said releasable four bar linkage, said releasable four bar linkage interposed between said pivotable member and said mounting plate, a first bar of said four bar linkage comprising a pivotable link supported for pivoting on a shaft, said pivotable link configured proximate one end thereof for engagement by a lock/release mechanism, said lock/release mechanism cooperating with said releasable four bar linkage (a) to engage said pivotable link to remove controlled compliance from said machine tool loader apparatus and (b) to disengage said pivotable link to add controlled compliance to said machine tool loader apparatus, the pivotable link and the lock/release mechanism being configured to control the amount of said controlled compliance when said lock/release mechanism is in said disengaged position, said loading/unloading apparatus adapted to pick up a single workpiece from a stack of workpieces residing on said workpiece staging area and deposit said workpiece on at least one said worktable proximate in front of a set of workclamps on the machine tool;

the numerical control machine tool being configured to fabricate parts from a raw, generally rectangular, generally flat metal workpiece and associated with said loader/unloader apparatus and including a frame, a metal working head associated with said frame, a drop leaf table associated with said frame, said drop leaf table adapted to unload small parts cut from said workpiece by said metal working head, at least one worktable located proximate each side of said frame and adapted to support a workpiece during processing, a first axis associated with said frame and adapted with a rail, said rail adapted to translatably support a first axis table and having a bracket and a photo switch mounted on said bracket, said photo switch adapted to determine the location of one edge of a workpiece, said first axis table adapted to carry workclamps and moveable by means of a first servo apparatus controlled by said numerical control, a workpiece registration apparatus associated with said workclamps and a sensor apparatus associated with said registration apparatus, said sensor apparatus determining a workpiece is correctly registered relative to said workclamps, a second axis associated with said frame, said second axis perpendicular to said first axis, said second axis adapted to cause relative motion between said working head and said workpiece, said second axis moveable by means of a second servo apparatus controlled by said numerical control;

said loading/unloading apparatus positioned proximate one of said worktables;

a workpiece staging area associated with said loading/unloading apparatus;

a large part unloading zone associated with said loading/unloading apparatus;

said numerical control adapted to move said workclamps to a calculated plate loading position and open said workclamps upon arrival at said loading position, unlock said releasable four bar linkage when said workpiece is deposited on said worktable proximate in front of said workclamps, cause the workpiece to be moved to a commanded position beyond said workpiece registration apparatus associated with said workclamps until said sensor apparatus signals said numerical control said workpiece is correctly registered, then stop motion and abort remaining motion command, cause said workclamps to close to clamp said workpiece, cause said loading/unloading apparatus to release said workpiece, cause said loading/unloading apparatus to retract to a standby position, cause said releasable four bar linkage to be locked, cause said first axis table carrying said workclamps and clamped said workpiece to move relative to said photo switch in a series of incremental moves such that the position of one edge of said workpiece proximately normal to the edge clamped by said workclamps is accurately determined by said photo switch, calculate the position of said one edge relative to said first axis "0" position, cause said workpiece to move to a position proximate said reposition cylinders, cause said reposition cylinders to clamp said workpiece, cause said workclamps to open thereby releasing said workpiece, cause said first axis table carrying said workclamps to reposition such that when said workclamps are closed and said first axis is moved to first axis "0" position one edge of said workpiece proximately normal to the edge clamped by said workclamps is accurately positioned relative to the centerline of said working head, cause said workclamps to close thereby gripping said workpiece, cause said reposition cylinders to retract thereby releasing said workpiece such that said workpiece is fully gauged and ready for processing by said machine tool;

said loading unloading apparatus adapted to unload a large part cut from said workpiece by said metal working head and too large for said drop leaf table;

said numerical control adapted to move said part handling apparatus from said standby position to a position such that said part handling apparatus can engage said large part, cause said part handling apparatus to engage said large part, cause said loading/unloading apparatus to lift said large part from said workpiece and move said large part to said large part unloading zone, cause said large part to be stacked on a pallet or table or be dropped into a container located within said large part unloading zone then cause said part handling apparatus to return to said standby position.

42. The loading/unloading apparatus of claim 41 wherein said workclamps move along both first axis and second axis directions and said metal working head remains stationary.

43. The loading/unloading apparatus of claim 41 wherein said first axis table carrying said workclamps also carries sets of tools.

44. The loading/unloading apparatus of claim 41 wherein said machine tool is a numerically controlled punch press having an automatic tool changer apparatus.

45. The loading/unloading apparatus of claim 41 wherein said machine tool is a numerically controlled punch press having an automatic tool changer apparatus and a thermal cutting apparatus.

46. The loading/unloading apparatus of claim 45 wherein said thermal cutting apparatus is a plasma torch apparatus.

47. The loading/unloading apparatus of claim 45 wherein said thermal cutting apparatus is a laser cutting apparatus.

48. The loading/unloading apparatus of claim 41 wherein said machine tool is a plasma cutting machine tool.

49. The loading/unloading apparatus of claim 41 wherein said machine tool is a laser cutting machine tool.

50. The loading/unloading apparatus of claim 41 wherein one of said worktables is a scrap table adapted to unload a skeletal remnant from said machine tool.

51. The loading/unloading apparatus of claim 50 wherein said worktable said workpiece is deposited on by said loading/unloading apparatus is said scrap table.

52. The loading/unloading apparatus of claim 41 wherein said workpiece staging area is a material staging station of a material storage tower apparatus, said material storage tower adapted with pallets to carry and store raw material and a loading side, said loading side having an elevator apparatus, said elevator apparatus adapted to move said pallets between a stored position within said material storage tower and a pallet transfer apparatus, said pallet transfer apparatus adapted to move said pallet to and from said material staging station, said material staging station adapted with magnetic sheet fanners, said material storage tower controlled by said numerical control of said machine tool.

* * * * *

UNITED STATES PATENT AND TRADEMARK OFFICE
CERTIFICATE OF CORRECTION

PATENT NO. : 6,608,282 B2
DATED : August 19, 2003
INVENTOR(S) : Michael A. Tomlinson, Sidney B. Schaaf and Alfred J. Julian It is certified that error appears in the above-identified patent and that said Letters Patent is hereby corrected as shown below:

Column 19,
Lines 24, 30 and 41, after "The", delete "-combination".

Column 20,
Line 16, after "a", delete "CNC" and insert -- numerically controlled --.
Line 19, after "The", delete "-combination".

Signed and Sealed this

Twenty-eighth Day of October, 2003

JAMES E. ROGAN
*Director of the United States Patent and Trademark Office*